US010735263B1

(12) United States Patent
McAlary et al.

(10) Patent No.: US 10,735,263 B1
(45) Date of Patent: Aug. 4, 2020

(54) SYSTEMS AND METHODS FOR AUTOMATICALLY CONFIGURING VIRTUAL NETWORKS

(71) Applicant: ATLASSIAN PTY LTD, Sydney, New South Wales (AU)

(72) Inventors: Benjamin McAlary, Sydney (AU); Nicolas Meessen, Sydney (AU); Shane Edward Anderson, Sydney (AU)

(73) Assignee: Atlassian Pty Ltd, Sydney, New South Wales (AU)

( * ) Notice: Subject to any disclaimer, the term of this patent is extended or adjusted under 35 U.S.C. 154(b) by 284 days.

(21) Appl. No.: 15/788,229

(22) Filed: Oct. 19, 2017

(51) Int. Cl.
*G06F 15/16* (2006.01)
*H04L 12/24* (2006.01)
*H04L 12/759* (2013.01)
*H04L 29/08* (2006.01)

(52) U.S. Cl.
CPC ...... *H04L 41/0886* (2013.01); *H04L 41/5054* (2013.01); *H04L 45/028* (2013.01); *H04L 41/082* (2013.01); *H04L 41/12* (2013.01); *H04L 67/1097* (2013.01)

(58) Field of Classification Search
CPC ............. H04L 41/0886; H04L 41/5054; H04L 45/028; H04L 41/082; H04L 41/12; H04L 67/1097
See application file for complete search history.

(56) References Cited

U.S. PATENT DOCUMENTS

| | | | | |
|---|---|---|---|---|
| 8,660,129 B1* | 2/2014 | Brendel | ............. | H04L 12/4641 370/397 |
| 2012/0233678 A1* | 9/2012 | Pal | ......... | G06F 21/445 726/7 |
| 2014/0068602 A1* | 3/2014 | Gember | ............. | G06F 9/45558 718/1 |
| 2014/0244851 A1* | 8/2014 | Lee | ..................... | H04L 12/4641 709/228 |
| 2015/0249573 A1* | 9/2015 | Miller | ................. | H04L 41/0816 709/221 |

* cited by examiner

*Primary Examiner* — Norman Abedin
(74) *Attorney, Agent, or Firm* — Hickman Palermo Becker Bingham LLP

(57) ABSTRACT

Described herein are methods and systems for automatically configuring virtual networks hosted by a cloud platform. This involves accessing configuration information defining a desired configuration and processing the configuration information to determine one or more required virtual network connections that, according to the configuration information, need to be created, each required virtual network connection defining a source virtual network and a destination virtual network that are to be connected. A connection is then automatically made to the cloud platform in order to create each required virtual network.

18 Claims, 13 Drawing Sheets

US 10,735,263 B1

SYSTEMS AND METHODS FOR AUTOMATICALLY CONFIGURING VIRTUAL NETWORKS

TECHNICAL FIELD

Aspects of the present disclosure are directed to the automatic configuration of cloud resources, and in particular the automatic configuration of virtual networks and connections in-between those networks.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

With the advent of cloud computing platforms, such as Amazon Web Services (AWS), ever more businesses are deploying and hosting applications and/or services "in the cloud"—i.e., on servers and storage modules maintained by cloud computing platforms. This affords flexibility (as organizations can dynamically increase/decrease storage and/or processing requirements based on utilization) and potentially cost savings (as organizations do not have to maintain or service the underlying hardware resources).

To access/manage resources hosted on cloud computing platforms, a user typically requires an application installed on his/her computing device that communicates with a cloud platform endpoint. Via the application the user can access, create, use, and manage cloud resources that the user has access to. Management of cloud resources can be time consuming and complicated.

SUMMARY

The appended claims may serve as a summary of the invention.

Figure 1:
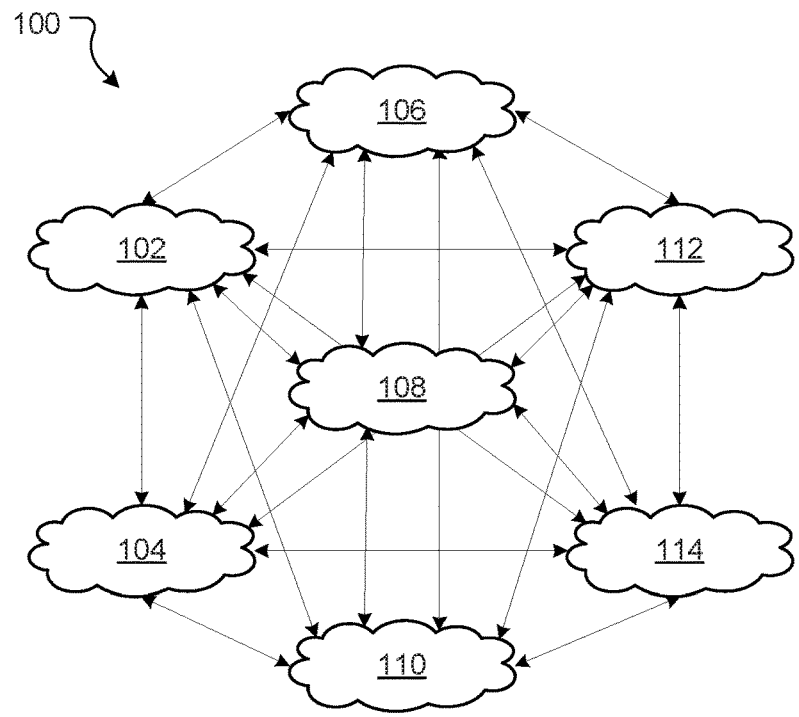
FIG. 1 depicts a logical architecture including several connected virtual networks.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Cloud computing providers offer a variety of cloud based resources and services for use. One such offering is allowing users to create their own virtual private cloud(s) (or, more generally, their own virtual networks) in which cloud resources can be provisioned and connected to one another. For ease of reference the acronym VPC will be used throughout this specification to refer to a virtual private cloud.

By way of example, Amazon allows users to provision a logically isolated section of the Amazon Web Services (a VPC) in which resources can be launched. The VPC is a virtual network that can be defined by the user—for example by selecting IP address ranges, creating subnets, configuring route tables and network gateways.

Amazon also allows connections to be created between VPCs. Amazon refers to these connections as peering connections or simply peerings (as will be used herein). A peering between two VPCs allows traffic to be routed between the two VPCs. Where a peering exists between two VPCs instances either VPC can communicate with the other VPC as if within the same network.

The present disclosure describes systems and methods for creating communication links between virtual networks within a cloud computing environment. For the purposes of description the embodiments will be described with reference to Amazon's AWS cloud infrastructure and creating peerings between VPCs. More generally, however, the principles describe herein can be adapted to automatically create communication links between virtual networks provided by other cloud environments/platforms—e.g. Google Cloud, Microsoft Azure Cloud, and any other cloud platform that facilitates the creation of virtual networks and connections between those networks. Accordingly, references herein to VPCs should be considered references to virtual networks more generally. Similarly, references to peerings or peering connections between VPCs should be considered references to communication links between virtual networks more generally.

FIG. 1 depicts a logical architecture 100 including a number of connected VPCs (i.e. virtual networks): 102, 104, 106, 108, 110, 112, and 114. As noted, Amazon provides a mechanism to create peerings between any two VPCs.

Generally speaking, in order to create a peering between two VPCs (e.g. VPC 102 and VPC 104) a user authenticates themselves with VPC 102 and requests a peering with VPC 104. Table A below provides an example AWS API call/command for requesting a peering connection between a source and destination VPC.

TABLE A

Example AWS request peering command

```
aws_client.create_vpc_peering_connection
(
    VpcId=vpc_pair_src['VpcId'],
    PeerVpcId=vpc_pair_dst['VpcId'],
    PeerOwnerId=vpc_pair_dst['account_number']
)
```

A user (who may or may not be the same user that requested the peering) then authenticate themselves with VPC 104 and accept the peering request received from VPC 102. Table B below provides an example AWS API call/command for accepting a peering connection between a source and destination VPC.

TABLE B

Example AWS accept peering command

```
aws_client.accept_vpc_peering_connection
    (VpcPeeringConnectionId=peering_request['VpcPeeringConnectionId'])
```

Once the peering request has been accepted the peering has been created. In order to enable the routing of traffic across the connection, the route tables of VPC 102 and VPC 104 are updated. Specifically a route table of VPC 102 is updated so traffic from VPC 102 can be routed to VPC 104, and a route table of VPC 104 is updated so traffic from VPC 104 can be routed to VPC 102. Table C below provides an example AWS API command to update a route table with a new route:

TABLE C

Example AWS route creation command

```
aws_client.create_route
(
    RouteTableId=route_table['RouteTableId'],
    VpcPeeringConnectionId=peering['VpcPeeringConnectionId'],
    DestinationCidrBlock=target]'ptool_peer_CidrBlock']
)
```

As can be seen, even the creation of a single peering can be time consuming. Furthermore, if an error is made when updating the route tables of either VPC the peering will be non-functional (or, at best, have compromised functionality). These issues are exacerbated when numerous peerings must be created. For example, in order to create a full mesh network between the seven VPCs illustrated in FIG. 1, twenty-one peering requests would need to be made, 21 peering acceptances performed, and 6×7×[number of route tables in each VPC] route table updates would need to be performed.

Embodiments described herein provide end users with a means of specifying configuration information that defines a desired peering configuration: i.e. the VPC peering connections that the user wishes to be in place between VPCs they have control over. A computational tool (referred to as a peering tool) then uses that configuration information to automatically create the desired connections.

A general systems overview will be provided initially. This will be followed by a description of the configuration information and, in turn, the operations performed by the computational peering tool.

Systems Overview

Figure 2:
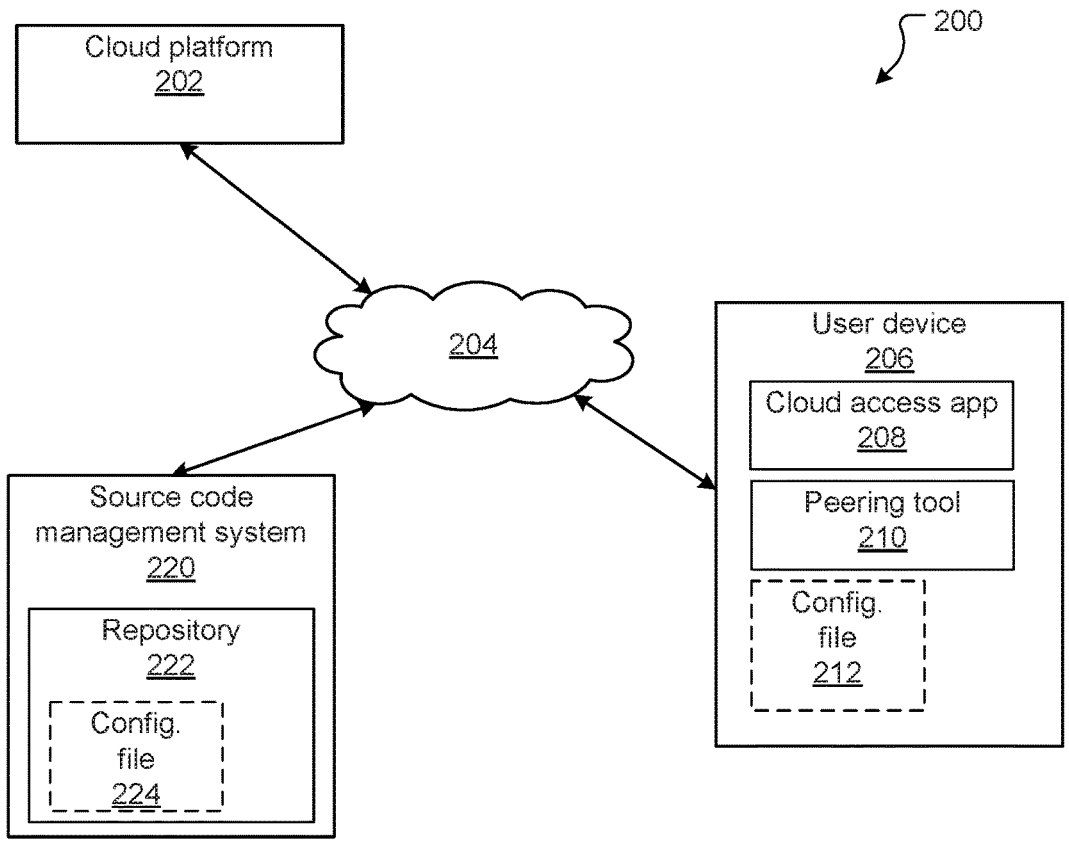
FIG. 2 depicts systems involved in the embodiments described herein.

FIG. 2 provides a high level depiction of the systems 200 involved in the present embodiments.

Systems 200 include a cloud platform 202. Cloud platform 202 typically includes a number of physical systems operated by a cloud provider such as Amazon (AWS). The physical systems of the cloud platform 202 host (or themselves are) resources (real or virtual) for end users. For example, the cloud platform may host/provide a number of VPCs as shown in FIG. 1. The cloud platform 202 provides a number of service endpoints accessible via a communications network 204 and through which end users can access and configure resources of the cloud platform 202 (using, for example, appropriate API commands).

A user interacts with the cloud platform 202 (or endpoints thereof) via a user device 206. While a single user device is shown many users interact with the cloud platform via many user devices. A user device 206 may be any suitable computing device, for example a mobile device (e.g. a tablet or mobile phone), a portable device (such as laptop computer), or any other computing device (e.g. a desktop computer).

A user device 206 includes at least one application 208 by which the device 206 can communicate with the cloud platform 202. The application may be a specific application dedicated to providing a means to interact with the cloud platform 202 or a generic application that can be so used (e.g. a command line interface provided with an operating system of device 206 and into which commands can be entered to interact with the cloud platform 202).

A user device 206 also includes (or provides access to) a peering tool application 210, the operation of which is described in detail below.

In certain embodiments, the user device 206 also stores a configuration file 212 in a local memory of the device 206. The configuration file 212 may be generated at the device 206 itself. The configuration file may be a version controlled file which is accessed from a source code management (or version control) system 220. In this case, the source code management system 220 maintains a repository 222 in which the configuration file 224 (or various versions thereof) is stored.

In certain embodiments the user device 206 need not locally store a copy of the configuration file 212. In this case the peering tool 210 is configured to directly access the configuration file from a remote location (either a source code management system 220 or other accessible storage location).

Configuration Information

As noted above, embodiments described herein make use of configuration information which defines a desired peering configuration. This section describes configuration information in respect of the Amazon AWS cloud platform.

In the context of the Amazon cloud platform, a given VPC exists within a region. Within a given region, embodiments described herein allow environments to be defined—an environment being a logical grouping of VPCs, for example for administrative purposes. A given VPC may be associated with one or more environments. Providing for logical groupings of VPCs in environments is useful as it allows mesh (or star) network topologies to be defined for different groups of VPCs. For example, consider environment 1 that includes VPCs A, B, and C and environment 2 that includes VPCs A, D, and E. VPC A contains a commonly desired service but VPCs B and C should not communicate with VPCs D and E. Embodiments described herein allow this type of arrangement to be achieved by defining a full mesh topology in environment 1 (which allows VPCs A, B, and C to communicate directly with one another) and a full mesh topology in environment 2 (which allows VPCs A, D, and E to communicate directly with one another).

Furthermore, a VPC is associated with an account that provides information on how the VPC is to be accessed/configured.

Accordingly, in certain embodiments configuration information in the AWS context includes: VPC identifiers (each VPC identifier identifying a specific VPC); account information in respect of accounts associated with the identified VPCs; environment information in respect of the environments to which the identified accounts belong; and region information in respect of the regions in which the environments exist.

In certain embodiments the configuration information further includes configuration metadata which allows certain administrative information to be defined/recorded.

By way of specific example, and again in accordance with certain embodiments only, this configuration information is defined/stored in a JSON formatted configuration file. An example format for the JSON configuration file and the specific information recorded is shown in Table D below:

TABLE D

Example configuration information

```
{
  "metadata":
  {
    "resource_owner": "Jane Smith",
    "business_unit": "Cloud Platform Engineering",
    "service_name": "ptool",
    "support": "support@support.com"
  },
  "regions":
  [
    {
      "region_name": "ap-southeast-2",
      "environments":
      [
        {
          "environment_name": "testing",
          "topology": "star",
          "hub_vpc": " vpc-5586a131",
          "accounts":
          [
            {
              "account_number": "12345",
              "role": "Network-Engineering ",
              "VpcIds":
              [
                "vpc-5586a131",
                "vpc-5287a036",
                "vpc-9a85a2fe",
                "vpc-2585a241"
              ]
            }
          ]
        }
      ]
    },
    {
      "region_name": "us-east-1",
      "environments":
```

TABLE D-continued

Example configuration information

```
      [
        {
          "environment_name": "development",
          "accounts":
          [
            {
              "account_number": "67890",
              "role": "Platform-Engineering ",
              "VpcIds":
              [
                "vpc-1358c674",
                "vpc-e7fa2680"
              ]
            },
            {
              "account_number": "34567",
              "role": "Network-Engineering-Dev-
                      Network-Engineering",
              "VpcIds":
              [
                "vpc-f8ac419e",
                "vpc-ed636e8a"
              ]
            }
          ]
        },
        {
          "environment_name": "staging",
          "accounts":
          [
            ...
          ]
        },
        {
          "environment_name": "production",
          "accounts":
          [
            ...
          ]
        }
      ]
    }
  ]
}
```

The configuration information in this example is a JSON object (i.e. a collection of key/value pairs, also referred to as a dictionary). The configuration object has two key/value pairs with keys respectively labelled "metadata" and "regions".

The value associated with the "metadata" key is itself an object with key/value pairs defining various metadata information. In this case the metadata information includes a resource owner, a business unit, a service name, and a support contact.

The value associated with the "regions" key is an array of regions. Each item in the region array is a region object providing information in respect of the region. In this particular example two region objects exist: "ap-southeast-2" and "us-east-1".

Each region object in the region array has two key/value pairs with keys respectively labelled "region_name" and "environments". For a given region object the value associated with the "region_name" key is a string providing the name of the region and the value associated with the "environments" key is an array of environment objects defining the environments associated with the named region. In this particular example, region "ap-southeast-2" has a single environment "testing", and region "us-east-1" has three environments: "development", "staging", and "production".

Each environment object in an environment has (potentially) four key/value pairs with keys respectively labelled "environment_name", "topology", "hub_vpc", and "accounts". For a given environment object: the value associated with the "environment_name" key is a string providing the name of the environment; the value associated with the "topology" key is a string defining the desired topology (e.g. star or full mesh); the value associated with the "hub_vpc" key is a string providing the VPC identifier of the desired hub VPC (in the case the a star topology is desired); and the value associated with the "accounts" key is an array of account objects defining the accounts associated with the environment.

In certain embodiments, the topology and/or hub keys may not be included or may be provided with no/invalid values (as is the case for the "development" environment in "us-east-1" region in the example of Table D above). This is interpreted by the peering tool as defining that a full mesh network should be created in which each VPC in the environment has a peering with each other VPC in the environment.

Each account object in the account array has three key/value pairs with keys respectively labelled "account_number", "role", and "Vpcids". For a given account object the value associated with the "account_number" key is a string providing an identifier for the account, the value associated with the "role" key is a string defining the role, and the value associated with the "Vpcids" key is an array of VPC identifiers (strings) defining the VPCs associated with the identified account.

In alternative embodiments, each account object may include further credentials that are needed (and can be used by the peering tool) to connect to the cloud platform using the account. Such credentials may include, for example, a user name (e.g. an Access key ID) for the account (if different to the account_number above) and a password (e.g. a secret access key) or other authentication information.

Further alternatively, and in the AWS context, the peering tool may be configured to connect to the cloud platform using a master account (with mast account credentials either programmed, accessible by the peering tool, or requested by the peering tool on execution). Such a master account (or master user) has the special ability to perform actions across all accounts associated with that master account by calling AWS's assume role API command, for example: "arn="arn:aws:iam::{0}:role/neteng-bot".format(account) assume_role(RoleArn=arn, RoleSessionName='network-management-session')". This allows the peering tool to login to the cloud platform a single time using the credentials of the master account and then assume different roles as required in order to perform the various operations with respect to various VPCs.

In certain embodiments the configuration information file may be stored/maintained in a source code repository 222 (e.g. a GIT repository) so anyone with appropriate permissions can access and update the configuration information and/or create a local copy thereof.

Other formats for storing/defining configuration information may be used, and additional/fewer/alternative specific information items may be included as part of the configuration information.

Furthermore, the configuration information may be defined/generated by a user in various ways. For example, a user may simply write or edit an appropriately formatted document (e.g. JSON document) directly via a text editor. Alternatively, a configuration tool may be used which provides users with an interface by which desired peerings between VPCs can be defined and those definitions used to generate configuration information in the appropriate format. In such a tool desired peerings can be defined in various ways—for example by graphically defining VPCs and then drawing (or otherwise creating) connections between VPCs.

Peering Tool

This section describes the operations of a computational peering tool which accesses configuration information (for example as described above) and automatically effects the desired peering configuration defined thereby in a cloud environment.

Figure 3:
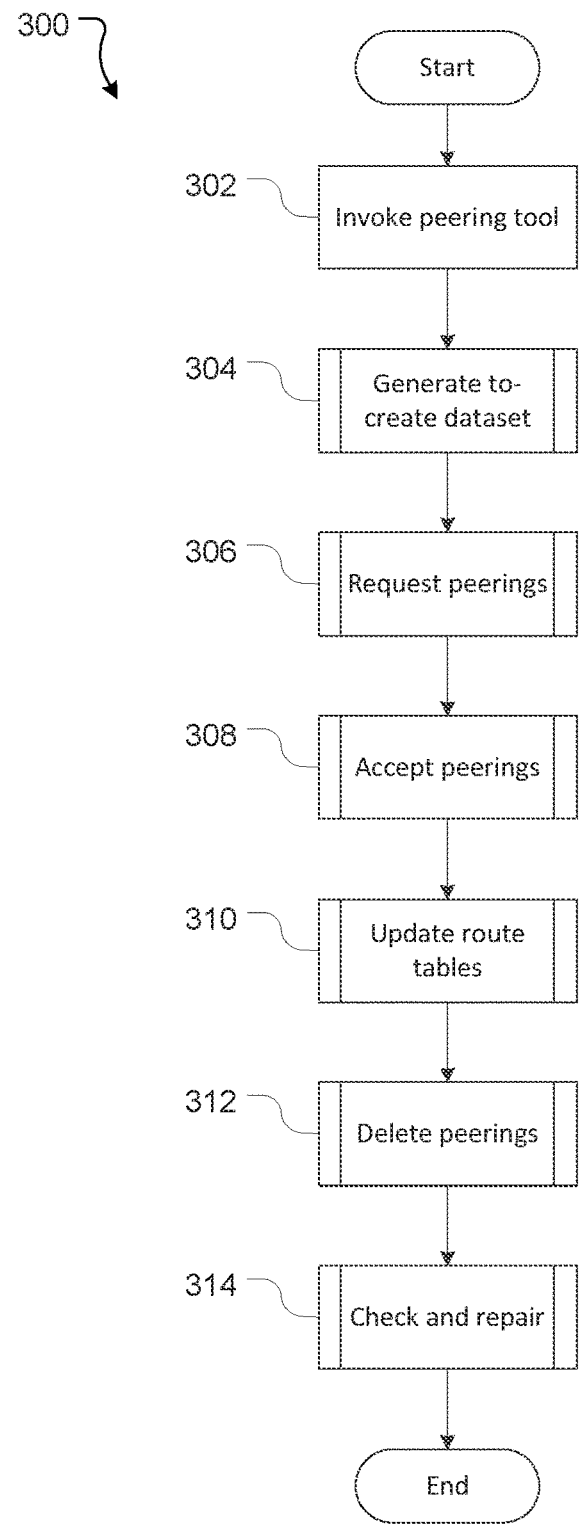
FIG. 3 is a flowchart showing high level operation of a programmatic tool for automatically creating communication links between virtual networks in accordance with certain embodiments.

High level operation of the peering tool (e.g. 210) is described with reference to process 300 of FIG. 3. Each sub-process is then described further with reference to FIGS. 4 to 12.

At 302 the computational peering tool is invoked/activated by an end user from a user computing device such as device 206. The tool may be invoked in various ways. For example, in certain embodiments the peering tool is invoked from a command line interface (for example by entering and submitting an appropriate command). In alternative embodiments the peering tool is invoked via a graphical user interface element (e.g. a GUI element such as a button or icon which can be clicked/contacted/otherwise activated by a user). Furthermore, in certain embodiments the peering tool operations described herein may be performed by the user device 206 itself, while in other embodiments some (or all) of the peering tool may be performed by a remote system (i.e. the user device 206 is used to invoke the peering tool but the actual processing is performed by an alternative computer system).

At 304, the peering tool operates to read/access configuration information and use that information to generate a to-create dataset. The to-create dataset defines peerings that need to be created in order to achieve the peering configuration defined in the configuration information. Generation of a to-create dataset is described below with reference to FIGS. 4 and 5.

At 306, the peering tool uses the to-create dataset to automatically generate and submit peering requests. The automatic request of peerings is described further below with reference to FIG. 6.

At 308, the peering tool operates to automatically accept the peerings requested at 306. The automatic acceptance of peerings is described further below with reference to FIG. 7.

At 310, the peering tool operates to automatically update route tables to allow the routing of traffic across the newly created peerings. The automatic update of route tables is described further below with reference to FIG. 8.

At 312, the peering tool operates to automatically identify and delete peerings (and routing information associated therewith) that are not part of the desired peering configuration. The automatic deletion of unneeded peerings is described further below with reference to FIGS. 9 and 10.

At 314, the peering tool operates to automatically perform a check and repair process to ensure that the peerings (and route table entries associated therewith) that exist on the cloud platform 202 match the desired configuration as defined in the configuration information. This accounts for the possibility that the topology of the virtual network being worked on may have been changed by actors other than the peering tool during process 300. The automatic check and repair process is described further below with reference to FIGS. 11 and 12.

Various operations described herein require the peering tool to connect to (or use an already established connection with) the cloud platform in order to configure a given VPC (e.g. to determine current peerings, to request peerings, to accept peerings, to edit a route tables, to delete peerings, etc.). A connection with the cloud platform (or a specific VPC) is made under a particular cloud platform account. Depending on the circumstances, for a given operation involving the cloud platform the peering tool may need to create a new connection with the cloud platform, may be able to resume an existing connection, and/or may assume a different role (in the case a master account is used as described above). A new connection is established by submitting relevant credentials to the cloud platform (e.g. account details such as an account name and password). As noted, credentials may be provided as part of the configuration information or be otherwise accessible to the peering tool at a known location or via a service. Alternatively, the peering tool may invoke a service in order to handle the required VPC connections.

Determining Peerings to be Created

Figure 4:
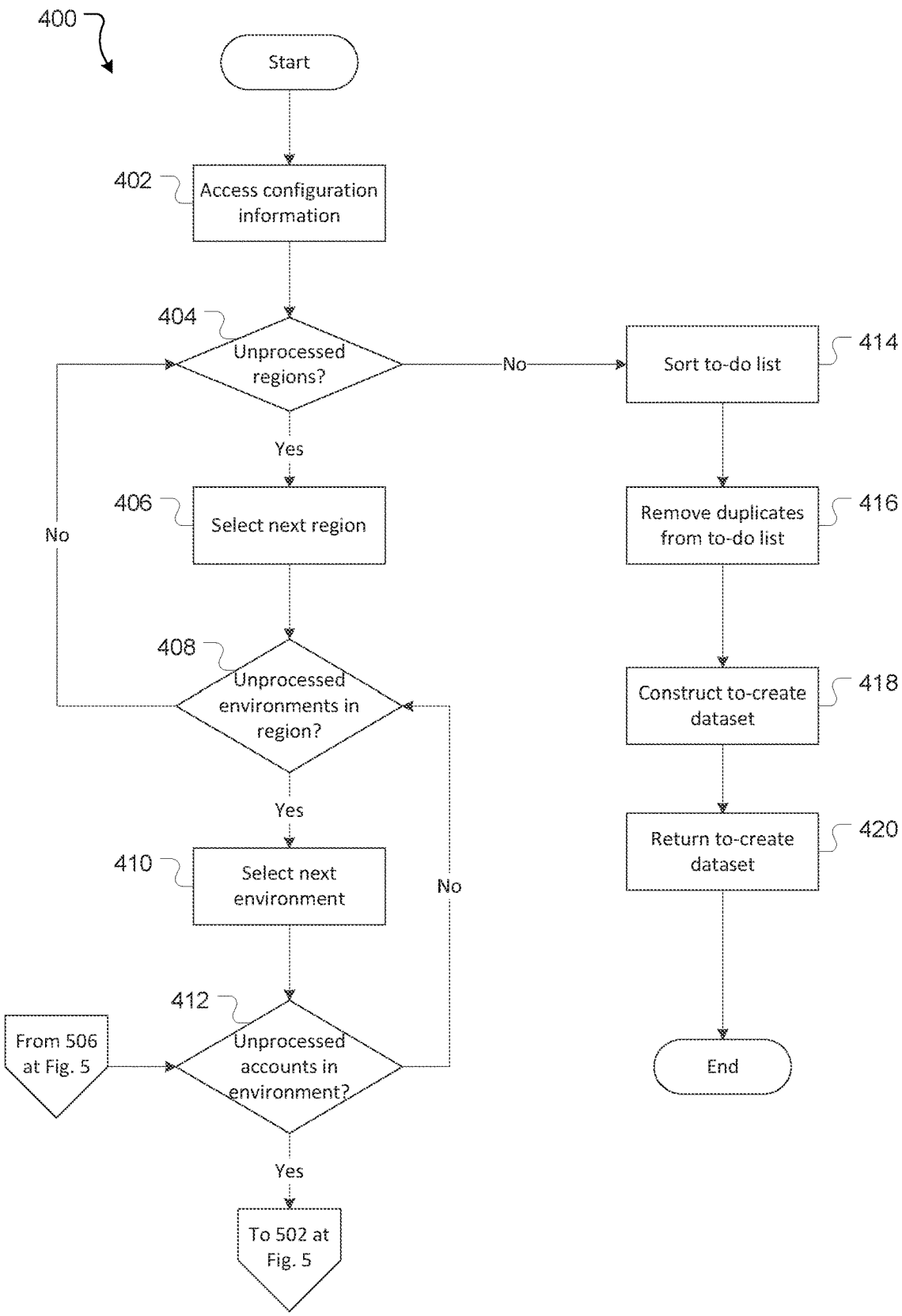
FIGS. 4 and 5 show a flowchart of operations involved in processing configuration information to determine communication links (peerings) that need to be created between virtual networks.

Determination of the peerings that need to be created (and generation of a to-create dataset describing those peerings) will be described with respect to process 400 shown in FIGS. 4 and 5.

At 402, the peering tool accesses configuration information. In certain embodiments configuration information is accessed from a configuration file 224 stored in a source code management system 220. In this case the location of the configuration file may be known by (e.g. coded into) the peering tool or may be passed to the peering tool as an argument/parameter on execution. Alternatively, the configuration information may be otherwise accessible by device 206 from which the peering tool was executed (e.g. from a configuration file 212 stored in local memory or memory accessible over a network).

At 404, the peering tool determines whether there are any unprocessed regions defined in the configuration information.

If, at 404, the peering tool determines that not all regions defined in the configuration information have been processed, processing continues to 406 where the peering tool selects the next region defined in the configuration information that is to be processed.

At 408, the peering tool determines whether the configuration information defines any environments for the currently selected region that have not yet been processed. If there are no unprocessed environments for the selected region the process returns to 404 to determine whether any unprocessed regions exist.

If, at 408, the peering tool determines that one or more environments for the current region have not been processed, processing continues to 410 where the next environment (associated with the current region) is selected for processing.

At 412, the peering tool determines whether the configuration information defines any accounts for the currently selected environment that have not been processed. If there are no unprocessed accounts for the currently selected environment, the process returns to 408 to determine whether any unprocessed environments for the current region exist.

Figure 5:
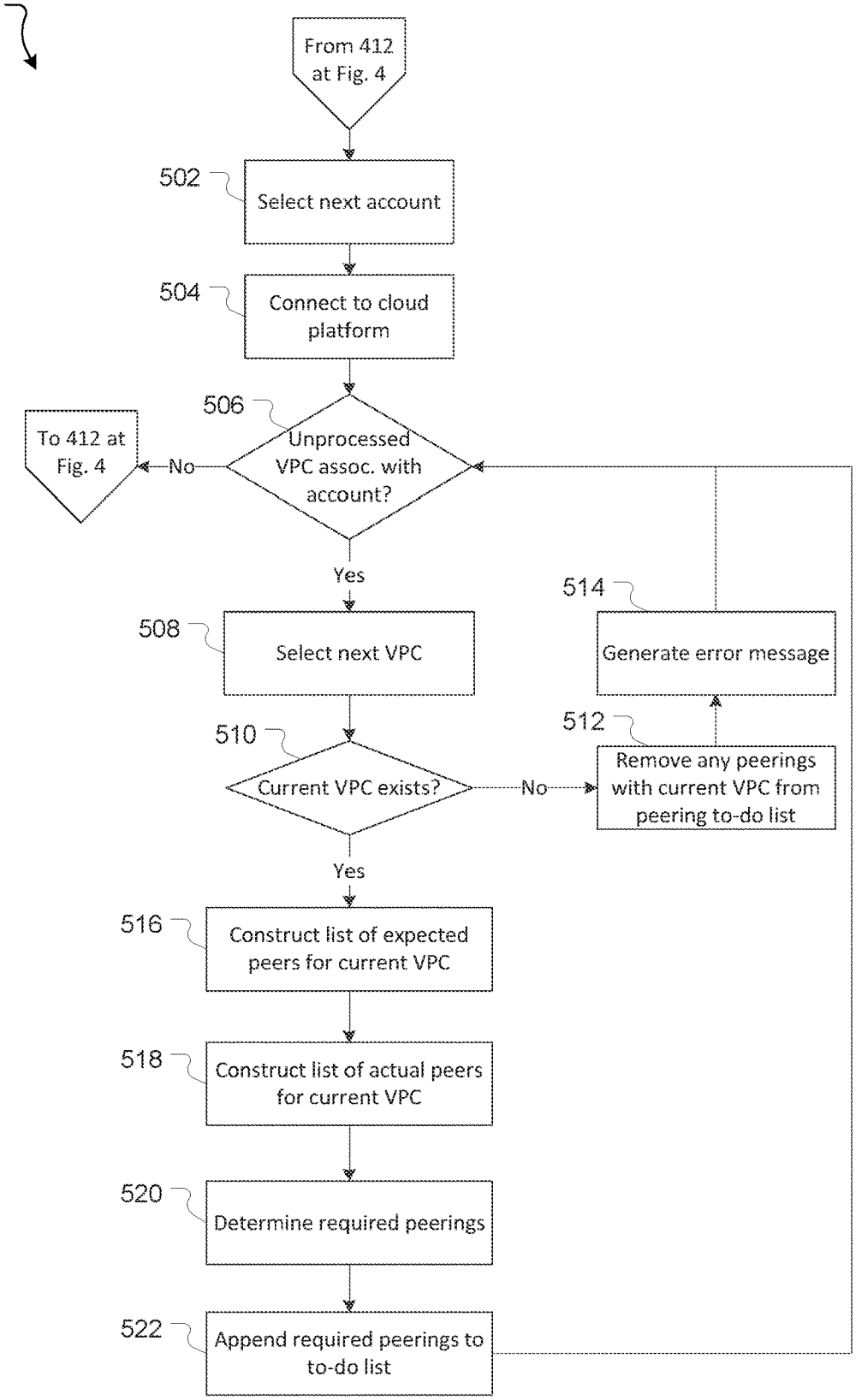

If, at 412, the peering tool determines that there is at least one unprocessed account for the currently selected environment processing continues to 502 (FIG. 5).

At 502, the peering tool selects the next account defined by the configuration information for the currently selected environment.

At 504, the peering tool connects to the cloud platform 202 under the currently selected account. Connection with the cloud platform is discussed above.

At 506, the peering tool determines if the configuration information defines any VPCs that are associated with the currently selected account and that have not yet been processed. If there are no unprocessed VPCs, the process returns to 412 (FIG. 4) to determine whether any further accounts for the currently selected environment need processing.

If, at 506, the peering tool determines there is at least one unprocessed VPC associated with the currently selected account processing continues to 508. At 508, the peering tool selects the next VPC associated with the currently selected account.

At 510, the peering tool determines whether the currently selected VPC exists. To do so, the peering tool uses the connection established at 504 to query the cloud platform. An example AWS API call/command for determining existing VPCs is as follows: "existing_vpcs_dict=aws_client.describe_vpcs( )".

If, at 510, the currently selected VPC does not exist, processing continues to 512 and 514 before returning to 506. At 512 the peering tool removes any peerings with the currently selected VPC from the to-do list (the to-do list is described further below). At 514 an error message is generated (e.g. for display or appending to a runtime log).

Conversely, if at 510 the currently selected VPC does exist processing continues to 516. At 516, the peering tool constructs a list of expected peers for the currently selected VPC. The list of expected peers is based on the configuration information and includes all VPCs defined within the currently selected environment (regardless of which particular account a VPC is associated with) that the currently selected VPC should be peered with.

For example, in the configuration information shown in Table D above, in the "testing" environment in the "ap-southeast-2" region a star topology has been defined with vpc-5586a131 as the hub. Accordingly, for account 12345 in this environment the expected peers for vpcb5586a131 (as the hub of the desired star topology) are vpc-5287a036, vpc-9a85a2fe and vpc-2585a241.

By way of further example, and referring again to the configuration information shown in Table D above, in the "development" environment in the "us-east-1" region no topology has been defined. This is interpreted by the peering tool to indicate that a full mesh network is desired (i.e. every VPC in the environment having a peering to every other VPC in the environment). Accordingly, under account 67890 the expected peers for vpc-1358c674 are vpc-e7fa2680 (also under account number 67890), vpc-f8ac419e (under account number 34567), and vpc-ed636e8a (under account number 34567).

At 518, the peering tool constructs an actual peer list for the currently selected VPC. The actual peer list includes any VPCs that the currently selected VPC already has a peering with. This information is obtained from the cloud platform using the connection established at 504. An example AWS API call/command for obtaining a current list of VPC peerings is as follows: "existing_vpc_peerings= client.describe_vpc_eering_connections( )".

At 520, the peering tool compares the expected peers for the currently selected VPC (per the expected peer list constructed at 516) with the actual peers for the currently selected VPC (per the actual peer list generated at 518) in order to determine the required peerings (i.e. those that need to be created). If a given expected peering does not exist in the actual peer list the peering is required/needs to be created. Alternatively, if a given expected peering exists in the actual peering list the peering does not need to be created. In this regard, it is noted that peerings are bidirectional. Accordingly, a peering between VPC-A and VPC-B is functionally equivalent to a peering between VPC-B and VPC-A. Therefore, if VPC-A← →VPC-B is an expected peering, then an actual peering of VPC-A← →VPC-B or VPC-B← →VPC-A means that the expected peering does not need to be created.

At 522, the peering tool appends information in respect of the required peerings for the currently selected VPC (identified at 520) to a to-do list.

Information in respect of a required peering may be defined in various ways. In certain embodiments a JSON object is used. Table E below provides one example of a required peering object:

TABLE E

Required peering object example

```
{
    "destination":
    {
        "role": "Platform-Engineering ",
        "VpcId": "vpc-e7fa2680",
        "account number": "1234"
    },
    "source":
    {
        "role":"Platform-Engineering ",
        "VpcId": "vpc-1358c674",
        "account_number": "1234"
    }
}
```

In the example shown in Table E, the required peering object includes information in respect of the destination (in a destination object) and source (in a source object) of the required peering. In turn, each of the destination and source objects includes information regarding the relevant role, VPC identifier, and account number for the destination/source VPC.

As process 400 proceeds, the peering tool appends peering objects to the to-do list at 522 under a JSON level that identifies the region and environment where the peering pair is to exist. Table F provides an example to-do list with 3 required peering objects in the "testing" environment in the "ap-southeast-2" region.

TABLE F

Example to-do list

```
{
    "ap-southeast-2":
    {
        "testing":
        [
            {
                "destination":
                {
                    "role": "..."
                    "VpcId": "...",
                    "account_number": "..."
                },
                "source":
                {
                    "role":
                    "VpcId": "...",
                    "account_number": "..."
```

TABLE F-continued

Example to-do list

```
            }
        },
        {
            "destination":
            {
                "role": "...",
                "VpcId": "... ",
                "account_number": "..."
            },
            "source":
            {
                "role": "...",
                "VpcId": "... ",
                "account_number": "..."
            }
        }
        ]
    }
}
```

Once the information in respect of the required peerings has been appended to the to-do list processing returns to 506 to determine whether any unprocessed VPCs associated with the currently selected account exist.

Returning to 404 (FIG. 4), once all regions defined in the configuration information have been processed processing continues to 414. In this case all accounts (and all VPCs associated therewith) in all environments in all regions defined in the configuration information have been processed and required peerings have been identified and added to the to-do list.

At 414, the peering tool sorts the to-do list.

At 416, the peering tool processes the sorted to-do list in order to identify and remove any duplicate peerings that appear. In this regard it is again noted that peerings are bidirectional, so if a peering between VPC-A and VPC-B is defined, a defined peering between VPC-B and VPC-A is a duplicate and can be removed.

For example, the to-do list may be sorted alphanumerically using python's standard inbuilt sort and sorted methods. The sorted list can then be de-duplicated using itertools method groupby.

At 418, the peering tool creates peering definitions in respect of the entries remaining in the to-do list and appends these peering definitions to a to-create dataset. In certain embodiments, the to-create dataset takes the same format as the to-do list described above—i.e. a number of peering objects, each peering object defining a source and destination VPC between which a peering needs to be created along with information in respect of the region and environment for that peering.

At 420, the to-create dataset is returned and process 400 ends.

Peering Request Generation and Submission

Figure 6:
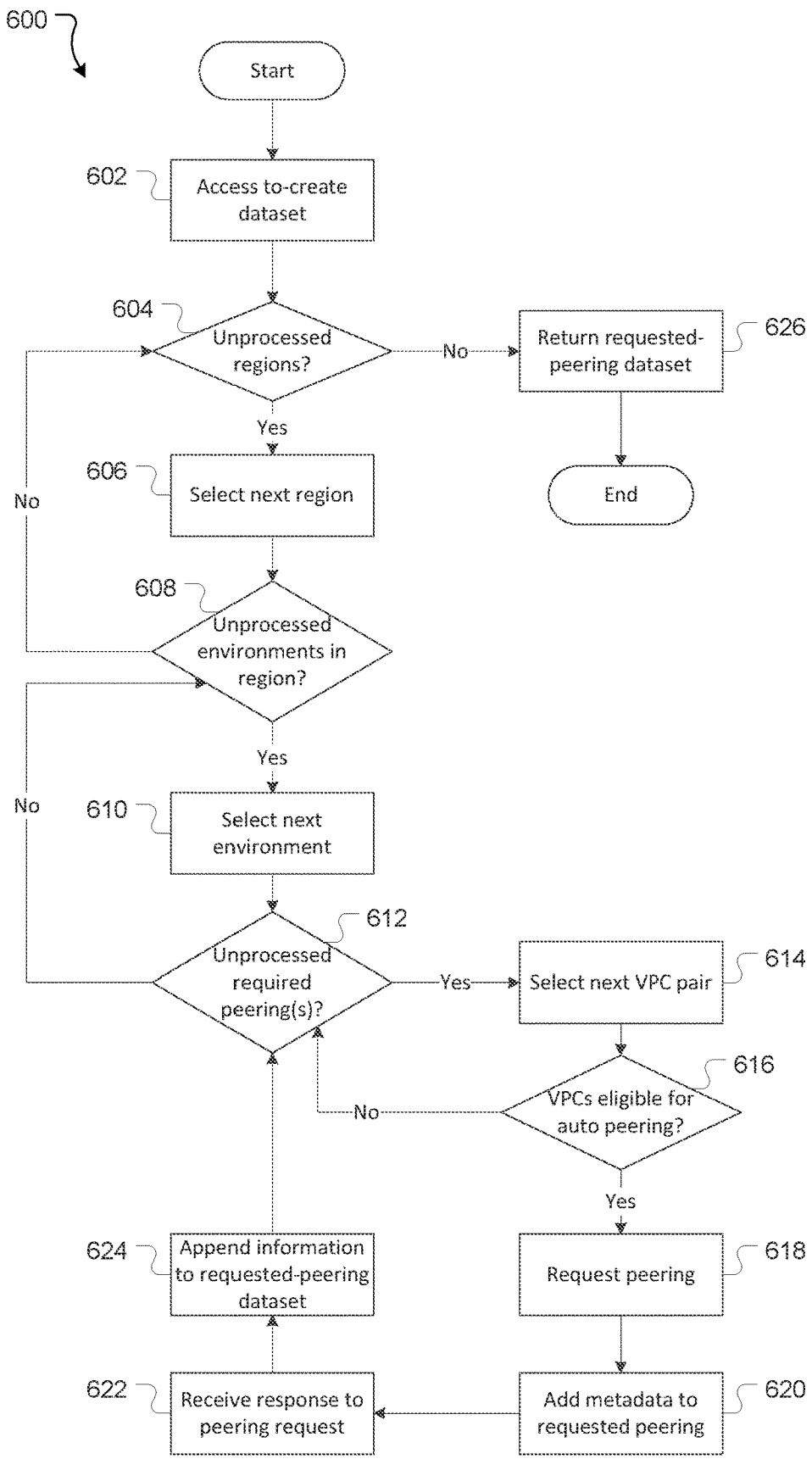
FIG. 6 is a flowchart showing operations involved in automatically requesting the creation of communication links between virtual networks.

The automatic generation and submission of peering requests will be described with reference to process 600 of FIG. 6.

At 602, the peering tool accesses a dataset defining the peerings that need to be created by the peering tool in order to achieve the peering configuration defined by the configuration information. In the present embodiment this is a to-create dataset generated by process 400 described above (or a similar process).

In the AWS context, and as at 8 Oct. 2017, AWS limits the number of outstanding VPC peering requests that can be requested from a given account to 25. Given this, and in certain embodiments, if the to-create dataset defines more than 25 peerings to be created the dataset is truncated to the first 25 peerings and process 600 (and downstream processes) can be run again for the truncated peerings in due course (i.e. once the peering requests made during process 600 have been accepted).

At 604, the peering tool determines whether there are any regions defined in the to-create dataset that have not yet been processed.

If, at 604, the peering tool determines that not all regions defined in the to-create dataset have been processed, processing continues to 606 where the peering tool selects the next region to be processed from the to-create dataset.

At 608, the peering tool determines whether the to-create dataset defines any environments for the currently selected region that have not yet been processed. If there are no unprocessed environments, the process returns to 604 to determine whether any regions remain to be processed.

If, at 608, the peering tool determines that not all environments for the current region have been processed, processing continues to 610 where the next environment (associated with the current region) is selected from the to-create dataset for processing.

At 612, the peering tool determines whether the to-create dataset defines any required peerings for the currently selected environment that have not yet been processed. If not, and all required peerings for the environment have been processed, the process returns to 608 to determine whether the to-create dataset defines any environments for the currently selected region that have not yet been processed.

If, at 612, the peering tool determines that the to-create dataset does defines one or more required peerings for the currently selected environment that have not yet been processed, processing continues to 614.

At 614, the peering tool selects the next required peering for the current environment from the to-create dataset.

At 616, the peering tool determines whether the two VPCs defined by the currently selected required peering are eligible for automated peering creation by the peering tool. In certain embodiments, a VPC is only eligible for automated peering if it has been tagged with eligibility information indicating it is eligible for automatic peering creation. A VPC may be tagged in various ways, for example by associating an eligibility tag with a route table of the VPC and setting the value of the entry to "True" when automatic peering is to be enabled. If automatic peering is not to be enabled the value can be set to "False" or the tag simply omitted. In this case, in order to determine that the current required peering can be created the peering tool checks that both VPCs associated with the peering have been tagged as eligible. If either VPC is ineligible for automatic peering creation (e.g. has not been tagged as eligible) then the peering cannot be automatically created by the peering tool.

In the Amazon context, such a check can be performed using an API call/command such as that shown in Table G below (in which the name of the eligibility variable in question is "ptool_eligible":

TABLE G example AWS API call/command

```
Filters = [{
    'Name': 'vpc-id',
    'Values': [target['VpcId']]}, {'Name': 'tag: ptool_eligible',
    'Values': ['true']
  }]
route_tables = aws_client.describe_route_tables(Filters=filters)
```

If, at 616, either VPC is not eligible for automatic peering creation, the process returns to 612 to determine whether any further required peerings are defined for the currently selected environment. In this case the peering tool may generate an error for to be displayed/appended to a session log.

Alternatively, if at 616 both VPCs are eligible for automatic peering creation, the process continues to 618.

At 618, the peering tool causes the peering defined by the currently selected required peering to be requested. In the AWS context, and in certain embodiments, this involves the peering tool connecting to the cloud platform using the relevant account and from the source VPC requesting a peering with the destination VPC (the relevant account, source VPC and destination VPC being defined by the information associated with the currently selected required peering in the to-create dataset). An example of an AWS API command in this regard is provided in Table H below:

TABLE H

Example AWS peering request

```
response = aws_client.create vpc_peering_connection
(
    VpcId=vpc_pair_src['VpcId'],
    PeerVpcId=vpc_pair_dst['VpcId'],
    PeerOwnerId=vpc_pair_dst['account_number']
) ['VpcPeeringConnection' ]
```

At 620, the peering tool adds metadata to the peering requested at 618. In the AWS context metadata is attached to the peering object by tagging that object. The metadata provides administrative information in respect of the peering. The metadata is used, for example, in downstream processes. For example, before deleting a peering the peering tool may operate to first check metadata to confirm that the peering was created by the tool itself. In certain embodiments this metadata includes the information shown in Table I below:

TABLE I

Example peering metadata

| Tag Field | Value |
| --- | --- |
| Name | Ptool VPC Peering to {account_number} {vpc} |
| resource_owner | Name |
| business_unit | Cloud Platform Engineering |
| service_name | Ptool |
| ptool_created | True [A flag indicating in this case that the peering was automatically created by the peering tool |
| ptool_support | support@support.com |
| ptool_datetime | The last time the peering tool touched this peering |
| ptool_direction | The source (i.e. where the peering request was created from) |
| ptool_environment | The environment from the configuration information |

At 622, the peering tool receives response information in respect of the peering requested at 618 from the cloud platform. At 624, the peering tool appends a requested peering object (generated using the response information received at 622) to a requested peering dataset.

Table J below provides an example of a requested peering object (the requested peering dataset in this case being a list of requested peering objects):

TABLE J

Example requested peering object

```
"Tags": [
  {
    "Key": "ptool_environment",
    "Value": "development"
  },
  {
    "Key": "service_name",
    "Value": "ptool"
  },
  {
    "Key": "ptool_support",
    "Value": "support@support.com"
  },
  {
    "Key": "Name",
    "Value": "ptool VPC Peering to 230789520196 vpc-1358c674"
  },
  {
    "Key": "ptool_created",
    "Value": "true"
  },
  {
    "Key": "ptool_direction",
    "Value": "destination"
  },
  {
    "Key": "ptool_accepted",
    "Value": "true"
  },
  {
    "Key": "resource_owner",
    "Value": "Jane Smith"
  },
  {
    "Key": "business_unit",
    "Value": "Cloud Platform Engineering"
  },
  {
    "Key": "ptool_datetime",
    "Value": "2017-08-08 15:18:22.734265"
  }
],
"ptool_region": "us-east-1",
"ptool_environment": "development",
"Status": {
  "Message": "Active",
  "Code": "active"
},
"AccepterVpcInfo": {
  "CidrBlock": "10.125.112.0/22",
  "ptool_role": "Network-Engineering-Dev-Network-Engineering",
  "VpcId": "vpc-c5ff6ea3",
  "PeeringOptions": {
    "AllowDnsResolutionFromRemoteVpc": false,
    "AllowEgressFromLocalClassicLinkToRemoteVpc": false,
    "AllowEgressFromLocalVpcToRemoteClassicLink": false
  },
  "OwnerId": "415432961280"
},
"RequesterVpcInfo": {
  "CidrBlock": "10.125.24.0/24",
  "ptool_role": "Platform-Engineering-Dev-Network-Engineering",
  "VpcId": "vpc-1358c674",
  "OwnerId": "230789520196"
},
"VpcPeeringConnectionId": "pcx-fae29993"
}
```

Once the requested peering object has been appended to the requested peering dataset the process returns to 612 to determine whether any further required peerings are defined for the currently selected environment.

Returning to 604, once all required peerings for all environments for all regions defined in the to-create dataset have been processed, the process continues to 626 where the requested peering dataset is returned. Process 600 then ends.

Peering Acceptance

Figure 7:
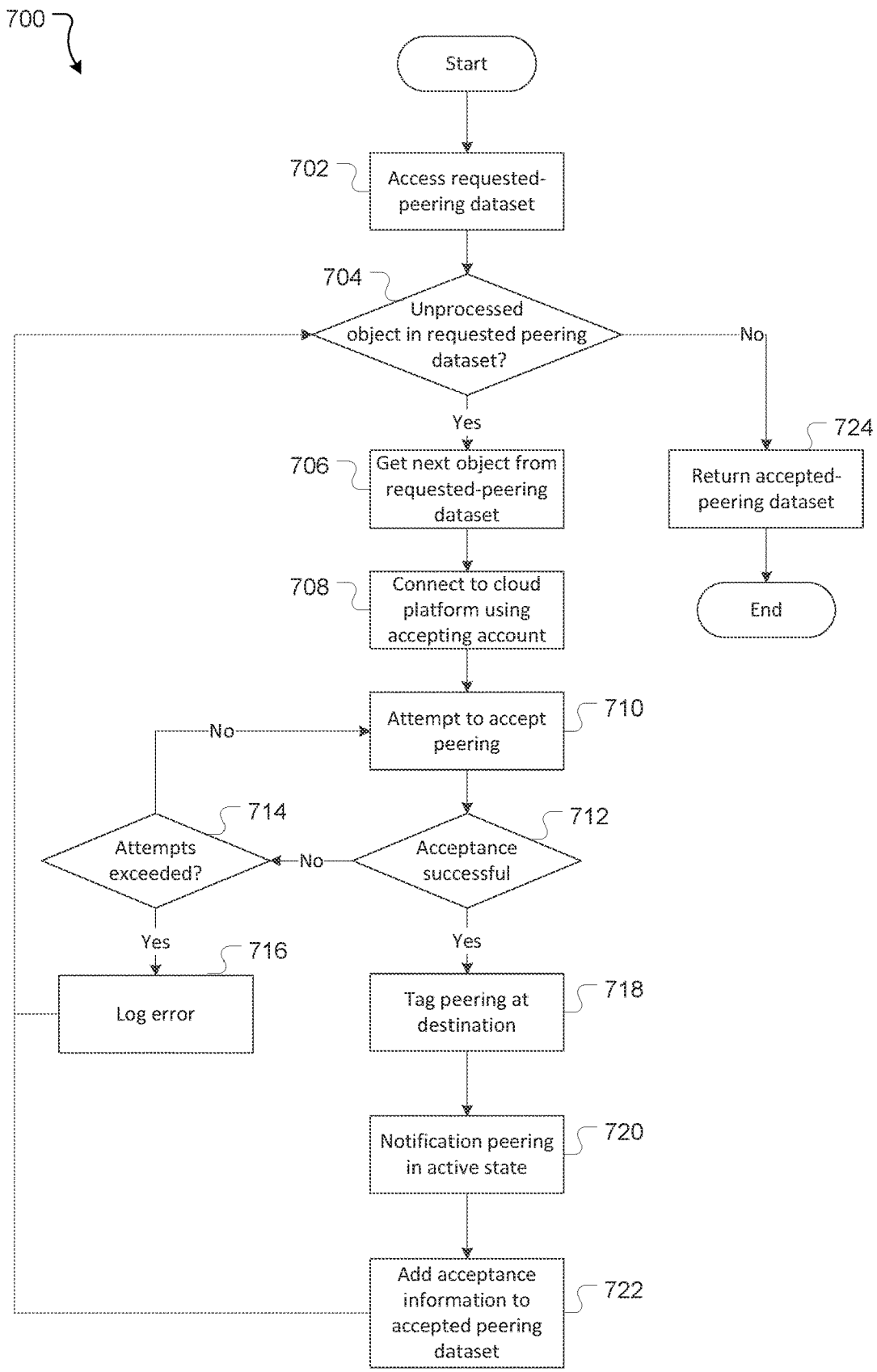
FIG. 7 is a flowchart showing operations involved in automatically accepting requested communication links.

The automatic acceptance of peerings will be described with reference to process 700 of FIG. 7.

At 702, the peering tool accesses a dataset providing information in respect of peerings that have been requested. In the present embodiment this dataset is a requested peering dataset generated by process 600 described above (or a similar process). Each object/item in the requested peering dataset defines a peering that has been requested, for example as shown in Table J above.

At 704, the peering tool determines whether there are any unprocessed requested peering objects in the requested peering dataset.

If, at 704, the peering tool determines that there are one or more unprocessed requested peering objects, processing continues to 706 where the peering tool selects the next requested peering object to be processed.

At 708, the peering connects to the cloud platform under the account for the VPC that needs to accept the peering request defined by the currently selected requested peering object.

At 710, the peering tool attempts to accept the requested peering defined by the currently selected requested peering object. An example AWS API call/command for accepting a peering request is as follows: "response=aws_client.accept_vpc_peering_connection (VpcPeeringConnectionId=peering_request['VpcPeering-ConnectionId'])".

At 712, the peering tool determines whether the acceptance attempted at 710 was successful. If not, the process continues to 714 to determine whether a threshold number of attempts has been exceeded.

If, at 714, the threshold number of attempts has not been exceeded the process returns to 710 to re-attempt accepting the peering. Conversely, if at 714 the threshold number of attempts has been exceeded the process continues to 716 where an error is logged (noting the failure to accept the peering request) and the process returns to 704 to see whether further unprocessed items in the requested peering dataset exist.

If, at 712, the peering tool determines that the acceptance attempt of 710 was successful, the process continues to 718.

At 718, the peering tool adds metadata to the peering that was successfully accepted at 710. The destination-side metadata provides administrative information in respect of the peering. In certain embodiments this metadata includes the information shown in Table K below:

TABLE K

Example peering metadata

| Tag Field | Value |
|---|---|
| Name | Ptool VPC Peering to {account_number} {vpc} |
| resource_owner | Name |
| business_unit | Cloud Platform Engineering |
| service_name | Ptool |
| ptool_created | True |
| ptool_support | support@support.com |
| ptool_datetime | The last time the peering tool touched this peering |
| ptool_direction | The destination (i.e. where the peering request was created from) |
| ptool_environment | The environment from the configuration information |
| ptool_accepted | True (indicates that the peering tool accepted the peering request) |

At 720, the peering tool waits for notification that the now-accepted peering has entered an active state In the AWS context, and in certain embodiments, this involves using a filter and the AWS API waiting function to wait for the peering to enter an active state.

At 722, the peering tool receives response information in respect of the accepted and now active peering. In certain embodiments, the response information is used to create an accepted peering object which is appended to an accepted peering dataset. Table L below provides an example of an accepted peering object (and in the case the accepted peering dataset is a list of such objects):

TABLE L

Example accepted peering object

```
{
  "RequesterVpcInfo":
  {
    "ptool_role": "Platform-Engineering-Dev-Network-Engineering",
    "OwnerId": "230789520196",
    "CidrBlock": "10.125.20.0/22",
    "VpcId": "vpc-e7fa2680"
  },
  "environment": "development",
  "AccepterVpcInfo":
  {
    "PeeringOptions":
    {
      "AllowEgressFromLocalClassicLinkToRemoteVpc": false,
      "AllowDnsResolutionFromRemoteVpc": false,
      "AllowEgressFromLocalVpcToRemoteClassicLink": false
    },
    "role":
    "Network-Engineering-Dev-Network-Engineering",
    "OwnerId": "415432961280",
    "CidrBlock": "10.125.18.0/24",
    "VpcId": "vpc-f8ac419e"
  },
  "VpcPeeringConnectionId": "pcx-835accea",
  "Tags":
  [
    {
      "Key": "ptool_accepted",
      "Value": "true"
    },
    {
      "Key": "ptool_datetime",
      "Value": "2016-11-2110:39:43.453056"
    },
    {
      "Key": "Name",
      "Value": "ptool VPC Peering to 230789520196 vpc-e7fa2680"
    },
    {
      "Key": "ptool_environment",
      "Value": "development"
    },
    {
      "Key": "ptool_created",
      "Value": "true"
    },
    {
      "Key": "service_name",
      "Value": "peering_tool"
    },
    {
      "Key": "ptool_direction",
      "Value": "destination"
    },
    {
      "Key": "business_unit",
      "Value": "Network Engineering"
    },
    {
      "Key": "resource owner",
      "Value": "name"
    }
  ],
  "Status":
  {
```

TABLE L-continued

Example accepted peering object

```
    "Code": "active",
    "Message": "Active"
  },
  "region": "us-east-1"
}
```

Once response information has been appended to the accepted peering dataset the process returns to 704 to determine whether any further objects in the requested peering dataset require processing.

Returning to 704, once all objects in the requested peering dataset have been processed, the process continues to 724 where the accepted peering dataset is returned. Process 700 then ends.

Route Table Updating

Once peerings have been accepted, the peering tool operates to automatically update routing tables. This will be described with reference to process 800 of FIGS. 8A and 8B.

At 802, the peering tool accesses a dataset providing information in respect of peerings that have been accepted. In the present embodiment this is an accepted peering dataset generated by process 700 described above (or a similar process). Each object/item in the accepted peering dataset defines a peering that has been accepted, for example as shown in Table L above.

At 804, the peering tool determines whether the accepted-peering dataset defines any peerings (i.e. objects) that have not yet been processed.

If, at 804, the peering tool determines that there are one or more unprocessed objects, processing continues to 806 where the peering tool selects the next object to be processed.

At 808, the peering tool connects to the cloud platform and checks that the peering defined by the object selected at 806 does actually exist (i.e. the peering exists and has been accepted by both sides). If the peering does not actually exist an error is generated/logged at 810 and the process returns to 804 to determine if other unprocessed objects in the accepted peering dataset exist.

If, at 808, the peering defined by the object selected at 806 does exist the process continues to 812.

At 812, the peering tool connects to the cloud platform in order to check and update the route table of one side of the peering (e.g. the requester VPC as defined by the selected object from the accepted peering dataset, referred to as the first side VPC at operation 812).

At 814, the peering tool determines whether there is at least one route table associated with the currently selected VPC that is eligible for automated peering creation. This operation may be similar to operation 616 (FIG. 6 above), involving checking whether there is at least one route table tagged with a value (e.g. "ptool_eligible":True) indicating the VPC is eligible for automatic peering creation.

If, at 814, the peering tool determines that none of the route tables associated with the currently selected VPC are eligible for automatic peering creation, the process continues to 816.

At 816 an error message is generated indicating that no route table was identified for the VPC (e.g. "WARNING: Did not find any ptool_eligible route table in account [x] region [y] VPC [z]".

Following generation of the error at 816, the peering tool determines at 817 whether the currently selected VPC is the first or second side of the peering connection. If at the VPC is the first side of the peering, processing continues to 834 (FIG. 8B) where the second side VPC in respect of the peering is selected. Alternatively, if the VPC is the second side of the peering, processing returns to 804 to determine whether further peerings require processing.

If, at 814, the peering tool determines that there is at least one route table eligible for automated peering creation, the process continues to 818.

At 818, the peering tool selects the next eligible route table for the VPC.

Figure 8A:
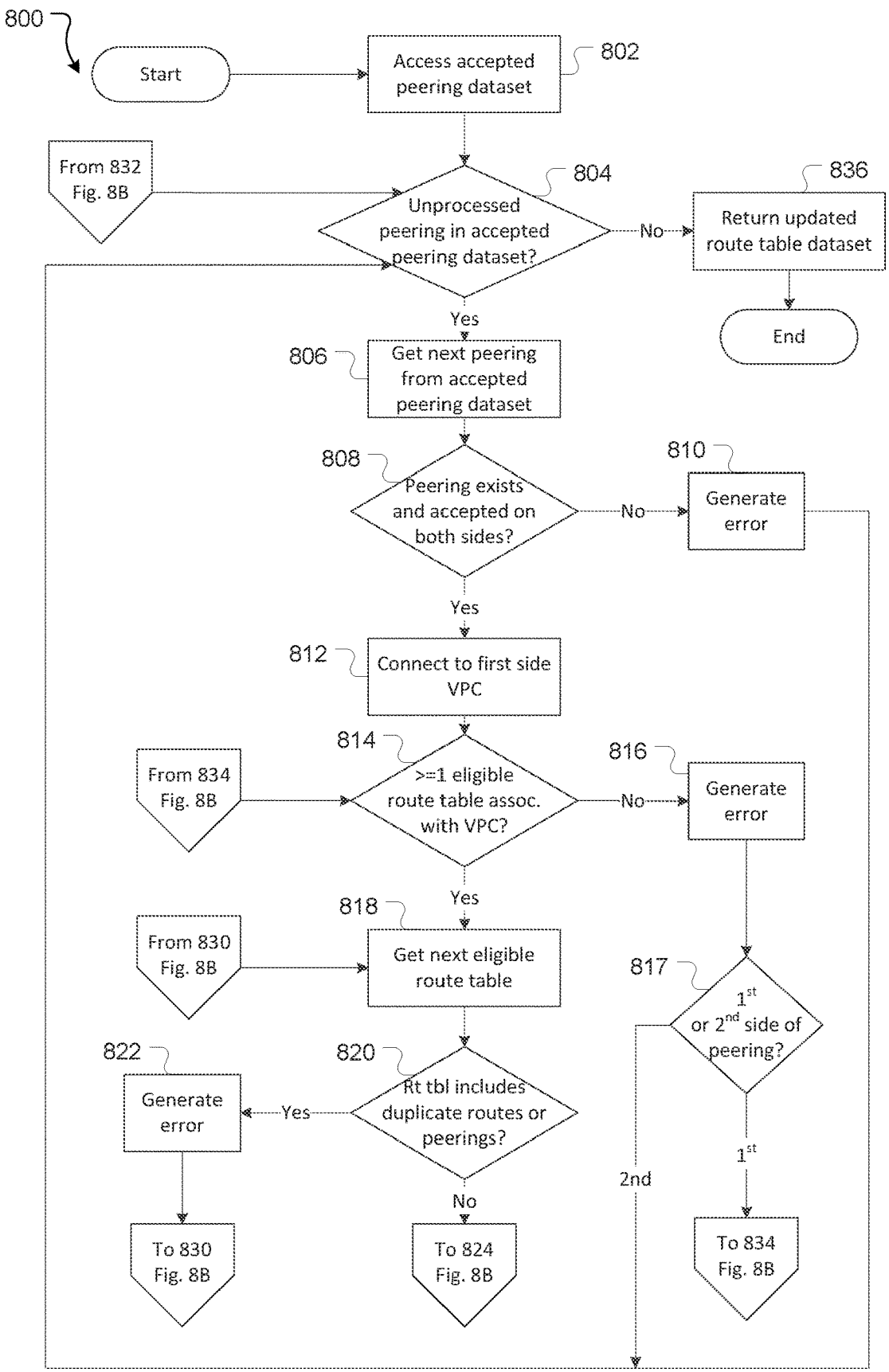
FIGS. 8A and 8B show a flowchart showing operations involved in automatically updating route information in respect of newly created communication links between virtual networks.
Figure 8B:
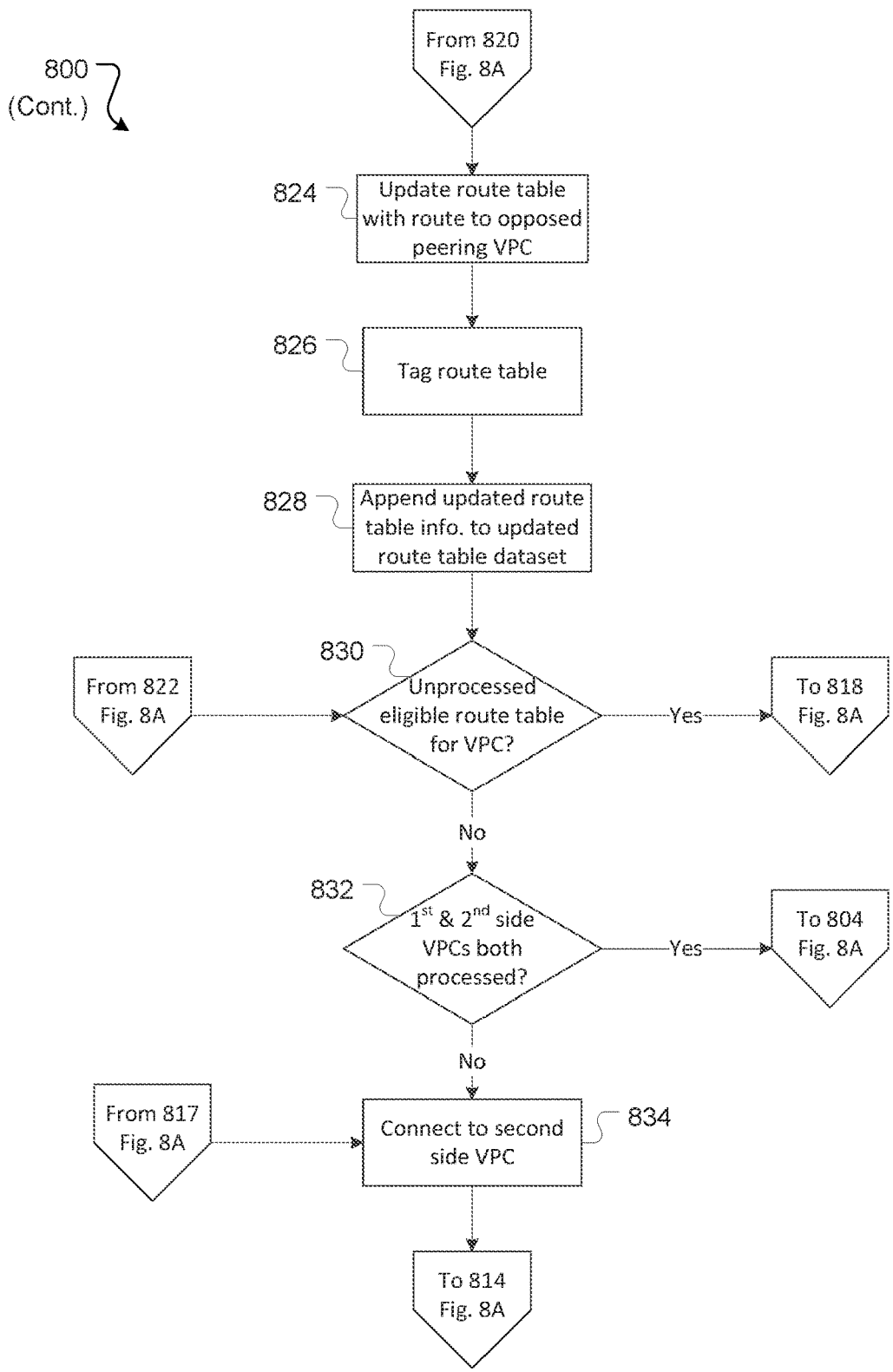

At 820, peering tool checks the selected route table to determine if the route table already includes a route for the peering. If so, the process proceeds to 822 and if not the process proceeds to 824 (FIG. 8B).

At 822, the peering tool generates an error message indicating that the route table already includes a route to the other side of the VPC. For example, an error message of the following form may be used: "Route table { } in account { } region { } VPC { } already has route { } for { }". The process then continues to 830 (FIG. 8B) to determine whether further eligible route tables for the VPC need to be processed.

At 824 (FIG. 8B), the peering tool updates the currently selected route table to allow for traffic to be routed from the currently selected VPC to the VPC that is the other side of the peering. This includes appending a route to the route table with the destination CIDR pointing to the other side of the peering.

At 826, the peering tool tags the route table updated at 824 with administrative information. In certain embodiments this information is as shown in Table M below:

TABLE M

Example information route table is tagged with

| Name Value | Value |
|---|---|
| ptool_modified | true (indicates peering tool has worked on this table) |
| ptool_datetime | The date of the last time peering tool touched this peering |
| ptool_environment | The environment from the configuration file |

At 828, the peering tool receives the response from the route table update process. The peering tool uses the response information to generate an updated route table object and appends this object to an updated route table dataset. Table N below provides an example of an updated route table object:

TABLE N

Example updated route table object

```
{
  "RouteTableId": "rtb-64154402",
  "PropagatingVgws": [],
  "Routes":
  [
    {
      "DestinationCidrBlock": "10.125.18.0/24",
      "GatewayId": "local",
      "Origin": "CreateRouteTable",
      "State": "active"
    },
    {
      "VpcPeeringConnectionId": "pcx-835accea",
      "DestinationCidrBlock": "10.125.20.0/22",
      "Origin": "CreateRoute",
      "State": "active"
    }
```

TABLE N-continued

Example updated route table object

```
  ],
  "VpcId": "vpc-f8ac419e",
  "Associations":
  [
    {
      "RouteTableId": "rtb-64154402",
      "Main": true,
      "RouteTableAssociationId": "rtbassoc-285a0751"
    }
  ],
  "Tags":
  [
    {
      "Key": " ptool_eligible",
      "Value": "true"
    },
    {
      "Key": "Name",
      "Value": ""
    },
    {
      "Key": " ptool_datetime",
      "Value": "2016-11-21 10:39:45.164178"
    },
    {
      "Key": " ptool_modified",
      "Value": "true"
    },
    {
      "Key": "ptool_environment",
      "Value": "development"
    }
  ]
}
```

At 830, the peering tool determines whether there are further eligible route tables for the currently selected VPC. This process is similar to that described above with respect to operation 814. If further eligible route tables for the VPC exist the process returns to 818 (FIG. 8A) to select and process the next eligible route table.

If, at 830, there are no further eligible route tables for the VPC to be processed, the process continues to 832.

At 832, the peering tool determines whether both VPC sides of the currently selected peering have been processed. If, at 832, both VPC sides of the peering have not been processed, the process continues to 834.

At 834 the peering tool connects to the cloud platform in order to check and update the route table of the other side of the peering (e.g. the acceptor VPC as defined by the selected object, referred to as the second side VPC at operation 834). Following this the process returns to 814 (FIG. 8A) in order to check/update the route table(s) of the other side of the peering.

If, at 832, the peering tool determines that the route tables for both sides of the peering have been processed, the process returns to 804 (FIG. 8A) to determine whether there are any further accepted peering objects in the accepted peering dataset to process.

At 804, once all objects in the accepted peering dataset have been processed, the process continues to 836 where the updated route table dataset is returned. Process 800 then ends.

Peering Deletion

Figure 9:
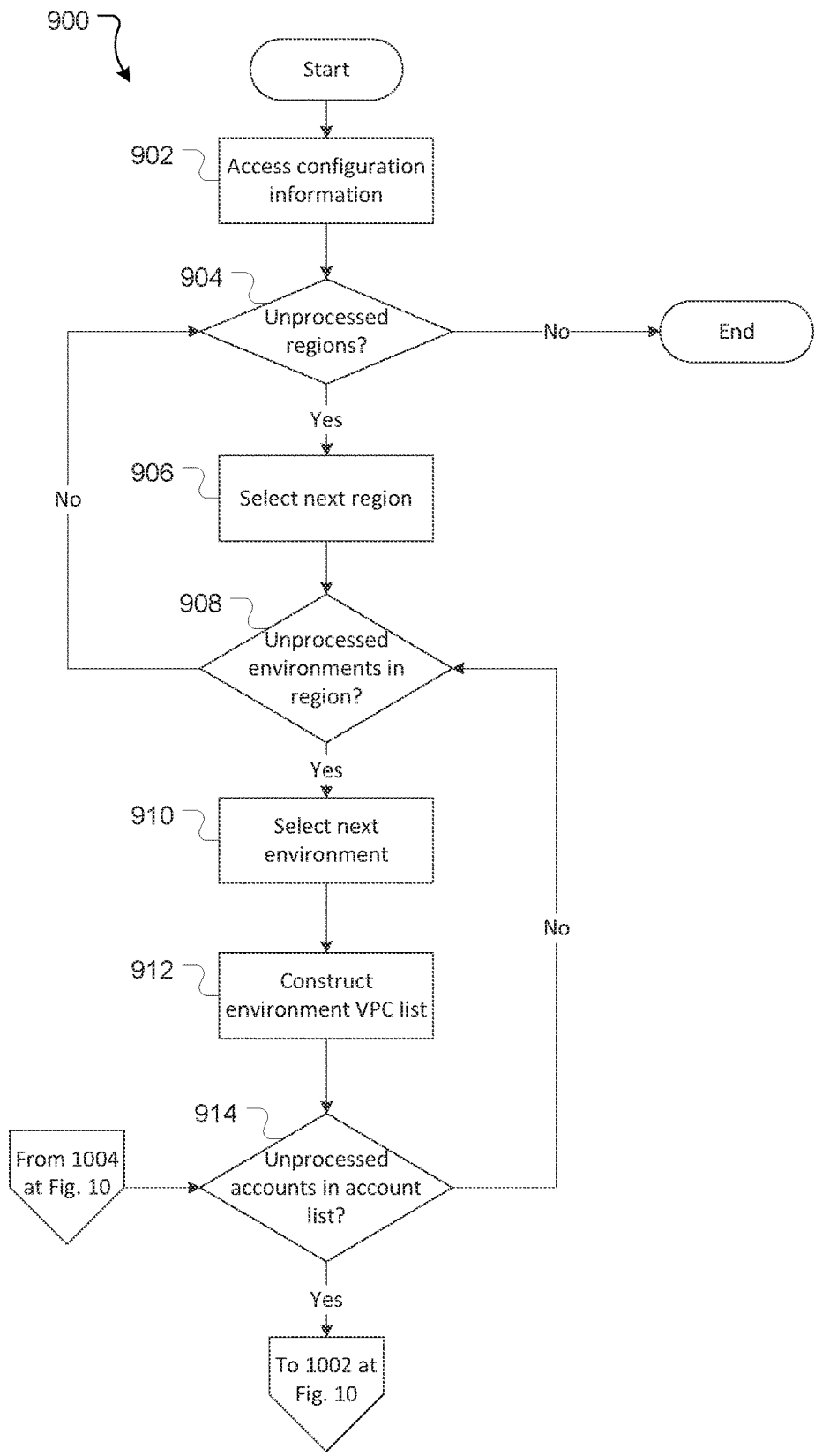
FIGS. 9 and 10 show a flowchart of operations involved in automatically identifying and deleting communication links between virtual networks that are not required.

The automatic deletion of unneeded peerings will be described with reference to process 900 shown in FIGS. 9 and 10.

At 902, the peering tool accesses the configuration information.

At 904, the peering tool determines whether the configuration information defines any regions that have not yet been processed. If all regions have been processed then process 900 ends.

If, at 904, the peering tool determines that not all regions defined in the configuration information have been processed, processing continues to 906 where the peering tool selects the next region to be processed from the configuration file.

At 908, the peering tool determines whether the configuration information defines any environments for the currently selected region that have not yet been processed. If all environments for the currently selected region have been processed, the process returns to 904 to determine whether any unprocessed regions exist.

If, at 908, the peering tool determines that not all environments for the current region have been processed, processing continues to 910 where the next environment (associated with the currently selected region) is selected for processing.

At 912, the peering tool constructs an environment VPC list. The environment VPC list includes VPC identifiers for all VPCs in the currently selected environment that, per the configuration information, should be involved in a peering connection.

At 914, the peering tool determines whether the configuration information defines any accounts for the currently selected environment that have not yet been processed. If all accounts for the currently selected environment have been processed, the process returns to 908 to determine whether any unprocessed environments for the current region exist.

Figure 10:
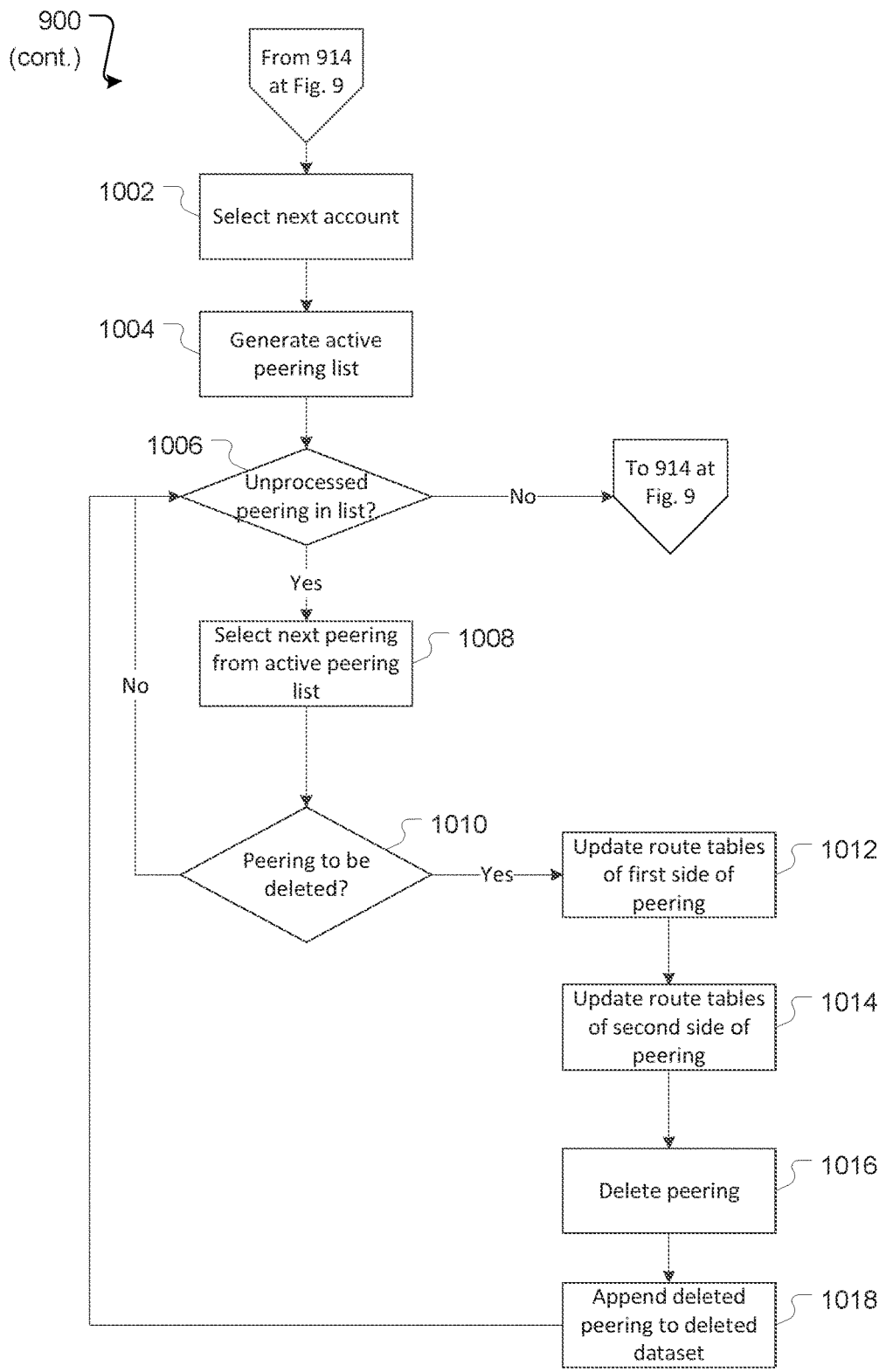

If, at 914, the peering tool determines that there is at least one unprocessed account for the currently selected environment, processing continues to 1002 (FIG. 10).

At 1002, the peering tool selects the next account for the currently selected environment.

At 1004, the peering tool generates an active peering list. To do so, the peering tool connects to the cloud platform under the currently selected account and requests a list of all active VPC peerings that have been created by the peering tool under that account. Determining that a peering has been created by the peering tool may be done by reference to metadata associated with the peering, for example a "ptool_ created" flag as described above. In the AWS example, this may be done via the AWS API and a command such as that shown in Table O below:

TABLE O

| example AWS API call/command to ascertain active peerings |
|---|
| filters = [<br>  {'Name': 'tag:ptool_created', 'Values': ['true']},<br>  {'Name': 'tag:ptool_environment', 'Values': [environment['environment_name']]},<br>  {'Name': 'status-code', 'Values': ['pending-acceptance', 'provisioning', 'active']}]<br>try:<br>vpc_peerings =<br>aws_client.describe vpc_peering_connections(Filters=filters)['VpcPeeringConnections'] |

At 1006, the peering tool determines whether all peerings in the active peering list generated at 1004 have been processed. If so, the process returns to 914 to determine whether further accounts in the present environment need processing.

If, at 1006, the peering tool determines that one or more peerings in the active peering list generated at 1004 still needs to be processed, the process continues to 1008.

At 1008, the peering tool selects the next unprocessed peering from the active peering list generated at 1004.

At 1010, the peering tool determines whether the peering from the active peering list that is currently being processed is needed or not. This involves the peering tool comparing the VPC identifiers of each side of the currently selected active peering against the environment VPC list generated at 912 (i.e. the list of VPC identifiers for VPCs in the currently selected environment that should have peerings). If either VPC identifier from the currently selected peering does not appear in the environment VPC list generated at 912, the peering is not needed and is eligible for deletion. Conversely, if both VPC identifiers from the currently selected peering appear in the environment VPC list generated at 912, the peering is valid and should not be deleted.

If, at 1010, the current peering should not be deleted, the process returns to 1006 to determine whether further peerings in the active peering list need to be processed.

Conversely, if at 1010 the current peering should be deleted, the process continues to 1012.

At 1012, the peering tool operates to delete all routes associated with the peering that is to be deleted from one of the VPCs that the peering is between (referred to as the first side of the peering). In order to do this the peering tool connects to the cloud platform to access the route table(s) of the first VPC and deletes all routes associated with the peering therefrom. I.e. if the peering being deleted is between VPC-A and VPC-B the peering tool accesses the VPC-A route tables to delete all routes to VPC-B (regardless of CIDR). Table P below provides an example AWS API call/command in this regard:

TABLE P

| Example AWS API call/command to delete routes |
|---|
| aws_client.delete_route<br>(<br>  RouteTableId=route table['RouteTableId'],<br>  DestinationCidrBlock=route['DestinationCidrBlock']<br>) |

At 1014, the peering tool operates to delete all routes associated with the peering that is to be deleted from the other VPC the peering is between (referred to as the second side of the peering). This operation mirrors operation 1012 above. For example, and continuing with the above example of a peering between VPC-A and VPC-B that is to be deleted, the peering tool accesses the route tables of VPC-B to delete all routes to VPC-A (regardless of CIDR).

At 1016, and once all routes in respect of the peering that has been deleted have been removed from the route tables, the peering tool deletes the peering itself. An example AWS API call/command to delete a peering is as follows: aws_client.delete_vpc_peering_connection(VpcPeering
ConnectionId=peering['VpcPeeringConnectionId'])

In certain embodiments, before actually deleting the peering at 1020 the peering tool may undertake one final check that all routes in respect of the peering have been successfully deleted (i.e. by checking the route tables of the VPCs involved in the peering). If this check fails operations 1012 and 1018 may be repeated a set number of times to re-attempt deletion of the routes. If the routes cannot be deleted an error is generated/logged and the process returns to 1006 without deleting the peering. Such a check is performed to prevent a peering from being deleted while route tables still include reference to it.

Following the deletion of the peering at 1016 the process returns to 1006 to determine whether or not further peerings need to be deleted. In certain embodiments information returned by the cloud platform on deletion of the peering may be appended to a deleted peering dataset for future reference/administrative use (such as list could then be returned once all regions have been processed and before process 900 ends).

Check and Repair

Figure 11:
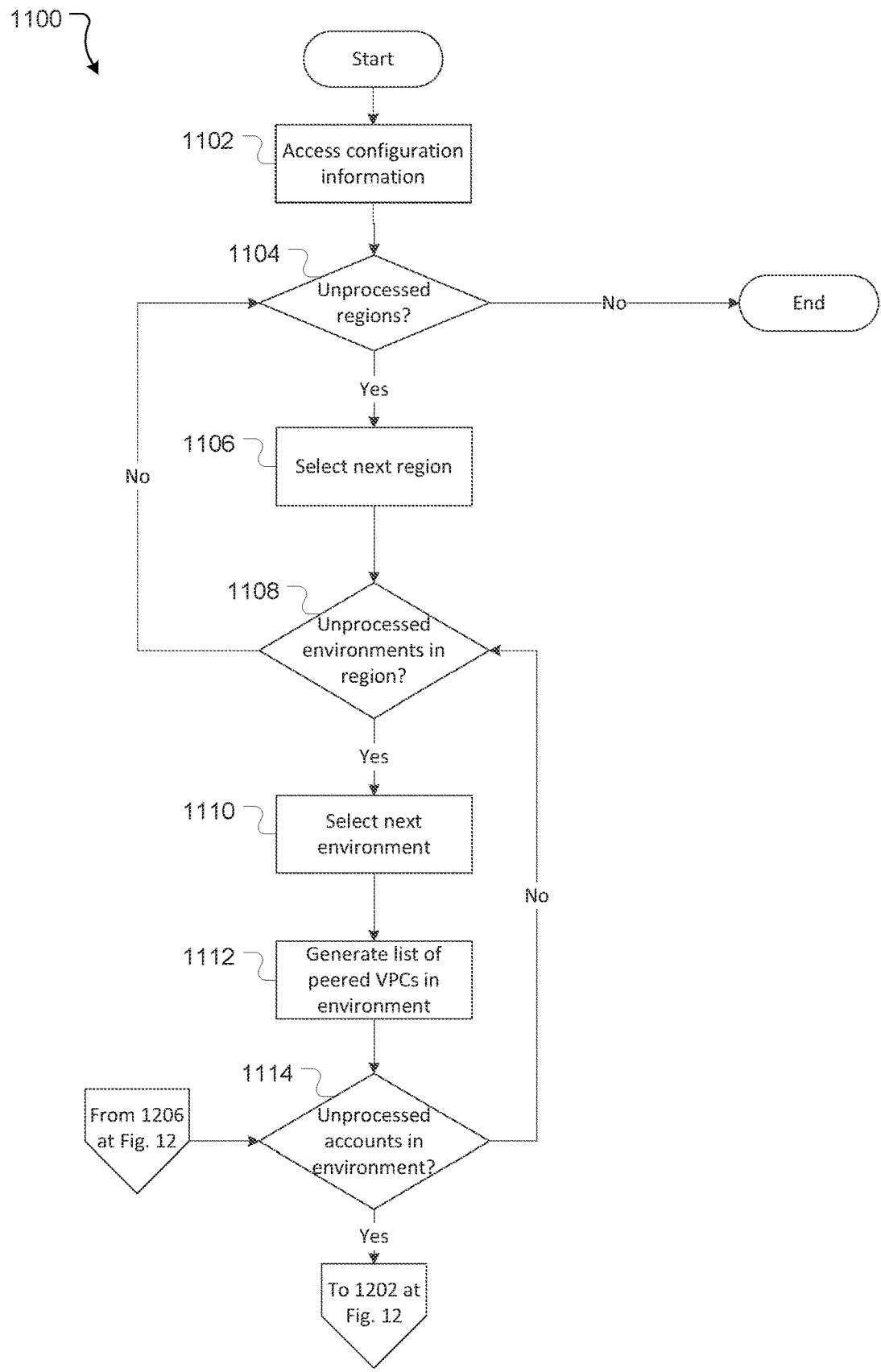
FIGS. 11 and 12 show a flowchart of operations involved in automatically checking and repairing communication links between virtual networks.

Checking and repairing the peerings and route entries that currently exist in the cloud platform will be described with respect to process 1100 shown in FIGS. 11 and 12.

At 1102, the peering tool accesses configuration information.

At 1104, the peering tool determines whether there are any unprocessed regions defined in the configuration information. If not, and all regions have been processed, process 1100 ends.

If, at 1104, the peering tool determines that not all regions defined in the configuration information have been processed, processing continues to 1106 where the peering tool selects the next region defined in the configuration information that is to be processed.

At 1108, the peering tool determines whether the configuration information defines any environments for the currently selected region that have not yet been processed. If all environments for the selected region have been processed the process returns to 1104 to determine whether any unprocessed regions exist.

If, at 1108, the peering tool determines that one or more environments for the current region have not been processed, processing continues to 1110 where the next environment (associated with the current region) is selected for processing.

At 1112, the peering tool generates a list of all peered VPCs within the currently selected environment—i.e. VPCs that should be part of one or more peerings.

At 1114, the peering tool determines whether the configuration information defines any accounts for the currently selected environment that have not been processed. If there are no unprocessed accounts for the currently selected environment, the process returns to 1108 to determine whether any unprocessed environments for the current region exist.

Figure 12:
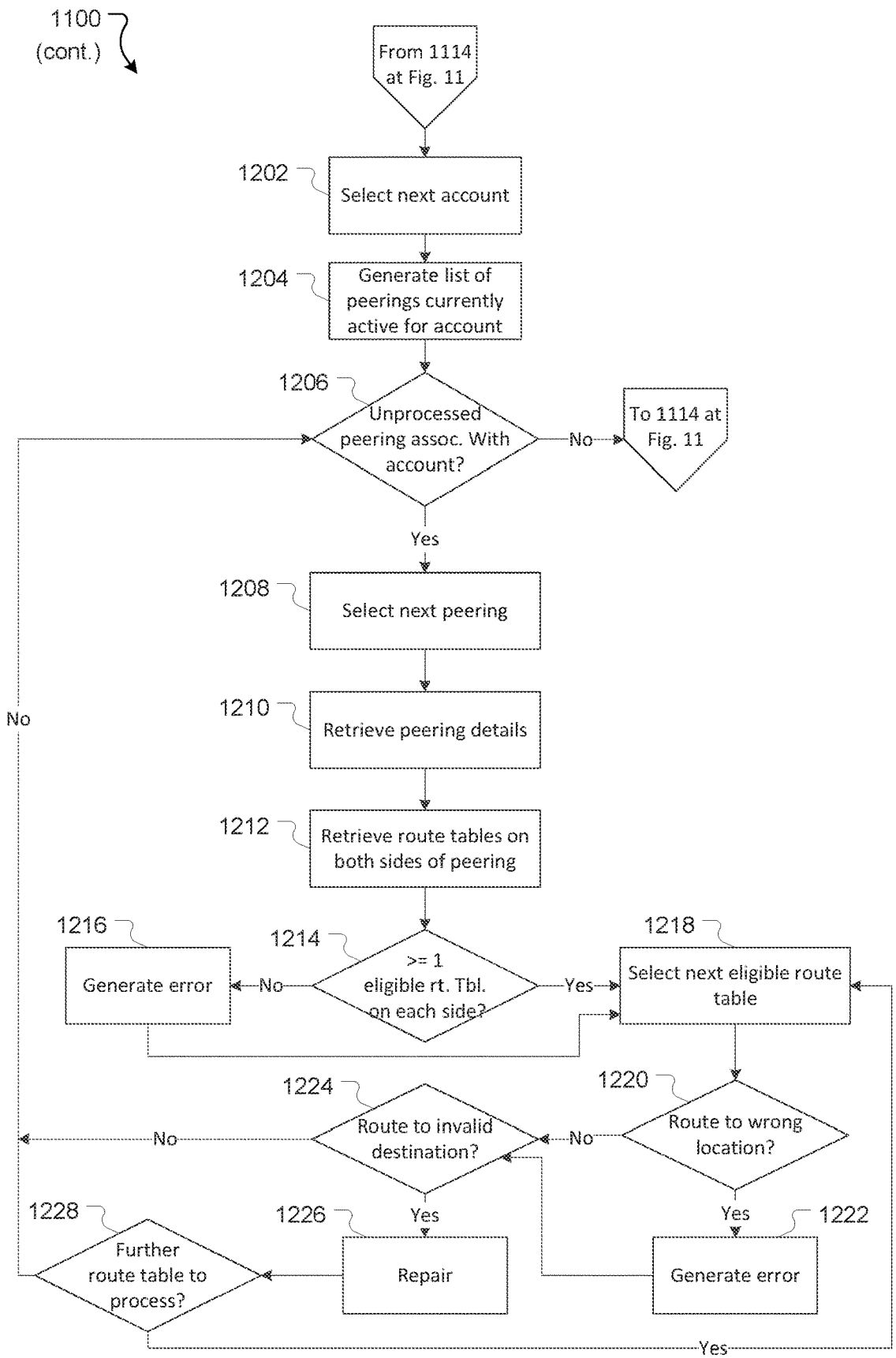

If, at 1114, the peering tool determines that there is at least one unprocessed account for the currently selected environment processing continues to 1202 (FIG. 12).

At 1202, the peering tool selects the next account defined by the configuration information for the currently selected environment.

At 1204, the peering tool generates a list of peerings currently active for the selected account. An example AWS API call to obtain such information is as follows: "vpc_peerings=aws_client.describe_vpc_peering_ connections(Filters=filters)['VpcPeeringConnections']".

At 1206, the peering tool determines if there are any unprocessed peerings in the list generated at 1204. If not, and all peerings in the list have been processed, the process returns to 1114 (FIG. 11) to determine whether any further accounts associated with the environment require processing.

If, at 1206, one or more peerings in the list generated at 1204 requiring processing, the process continues to 1208 where the next peering in that list is selected.

At 1210, the peering tool retrieves details in respect of the peering selected at 1208 from the cloud platform. An example AWS API call for this purpose is as follows: "aws_client.describe_vpc_peering_connections(VpcPeeringConnectionIds=[peering['VpcPeeringConnectionId']])['VpcPeeringConnections'][0]".

At 1212, the peering tool retrieves all route tables from the two VPCs associated with the peering. An example AWS API call for this purpose is as follows: "route_tables=aws_client.describe_route_tables (Filters=filters)['RouteTables']".

At 1214, the peering tool determines whether each VPC associated with the peering has at least one eligible route table. Eligible route tables and checking therefore has been described above.

If, at 1214, one or both of the VPCs does not have an eligible route table, the process continues to 1216. Conversely, if both VPCs do have at least one eligible route table, the process continues to 1218.

At 1216, the peering tool generates an error/warning. Such an error/warning may, for example, take the following form: "LOGGER.warn("Didn't find any ptool_eligible route table in account { } region { } VPC { }".format". Following generation of the error/warning the process continues to 1218 (unless there are no eligible route tables associated with either VPC, in which case the process returns to 1206).

At 1218, the peering tool selects the next eligible route table from one of the VPCs. Eligible route tables from the VPCs may be processed in any order.

At 1220, the peering tool checks the route table selected at 1218 to determine whether it defines any routes that should be pointing across the currently selected peering but are not (i.e. are pointing at something else). If, at 1220, there are one or more routes pointing to the wrong location the process continues to 1222. Otherwise the process continues to 1224.

At 1222, the peering tool generates an error/warning to alert a user to the fact that one or more routes are pointing to the wrong location. The process then continues to 1224.

At 1224, the peering tool checks the route table selected at 1218 to determine whether it defines any routes that point to an invalid destination. This could occur, for example, if a peering has been deleted by a user or process but one or more routes associated with that peering were not deleted. If, at 1224, there are one or more routes pointing to an invalid destination the process continues to 1226. Otherwise the process returns to 1206 to determine whether any further peerings associated with the account need to be processed.

At 1226, the peering tool repairs any routes identified at 1224. In certain embodiments route tables are repaired by deleting the invalid route(s) and adding correct routes.

Table Q below provides an example AWS API call for deleting a route from a route table:

TABLE Q

| example AWS API call for deleting a route from a route table |
| --- |
| aws_client.delete_route<br>(<br>   RouteTableId=route_table['RouteTableId'],<br>   DestinationCidrBlock=route['DestinationCidrBlock']<br>) |

Table R below provides an example AWS API call for adding a route to a route table:

TABLE R

| example AWS API call for adding a route to a route table |
| --- |
| response = aws_client.create_route<br>(<br>   RouteTableId=route_table['RouteTableId'],<br>   VpcPeeringConnectionId=peering['VpcPeeringConnectionId'],<br>   DestinationCidrBlock=target['ptool_peer_CidrBlock']<br>) |

At 1228, the peering tool determines whether any further eligible route tables for the peering require processing. If so, the process returns to 1218 to select the next eligible route table. If not, processing returns to 1206 to determine whether any further peerings associated with the current account require processing.

Hardware Overview

The operations/techniques described herein are implemented by one or more special-purpose computing systems or devices. For example, in systems diagram 200 the user device 206 will typically be a stand-alone computer system, and the cloud platform 202, network 204, and source code management system 220 will typically be implemented by a number of interconnected computing systems.

A given computing system may be hard-wired to perform the operations described and referred to herein, or may include digital electronic devices such as one or more application-specific integrated circuits (ASICs) or field programmable gate arrays (FPGAs) that are persistently programmed to perform the operations, or may include one or more general purpose hardware processors programmed to perform the operations pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 13:
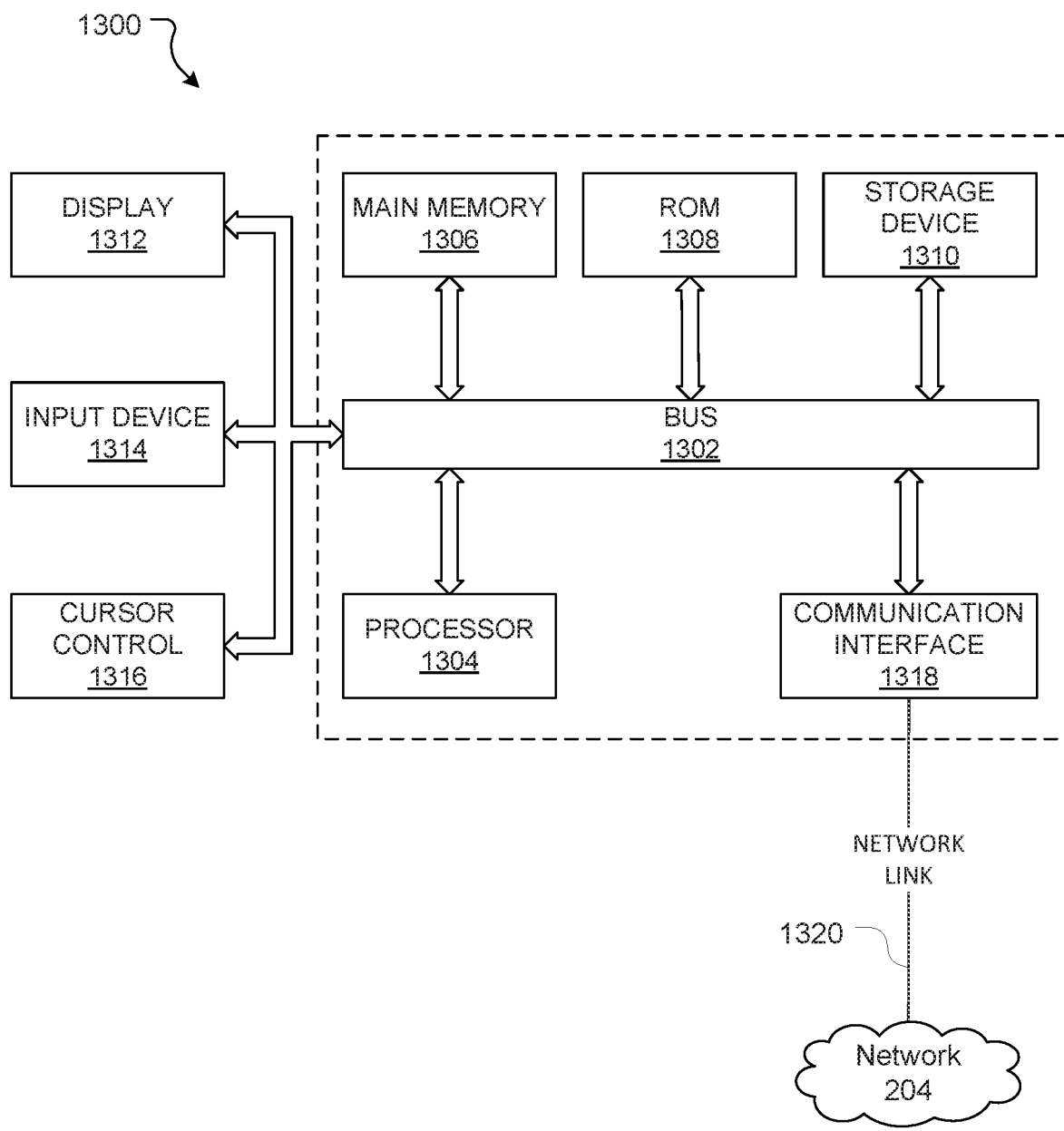
FIG. 13 is a block diagram of a computing system which may be used to implement various features of the present disclosure.

For example, FIG. 13 is a block diagram that illustrates a computer system 1300. Operations described and referred to herein may be performed by such a computer system. For example, user device 206 may be a computer system such as system 1300.

Computer system 1300 includes a bus 1302 or other communication mechanism for communicating information between its various components. A hardware processor 1304 for processing information is also provided, and is coupled with bus 1302. Hardware processor 1304 may be, for example, a general purpose microprocessor.

Computer system 1300 also includes a main memory 1306, such as a random access memory (RAM) or other dynamic storage device, coupled to bus 1302 and for storing information and instructions to be executed by processor 1304. Main memory 1306 also may be used for storing temporary variables or other intermediate information during execution of instructions by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 as depicted further comprises one more output devices such as a display 1312 for displaying information. Display 1312 may, for example, be a cathode ray tube (CRT), a liquid crystal display (LCD), a light emitting diode (LED display), or a touch screen display. An input device 1314, such as a keyboard, keypad, touch screen, is also provided (and coupled to bus 1302) for communicating information and command selections to processor 1304. Another type of user input device is cursor control 1316, such as a mouse, a trackball, or cursor direction keys for communicating direction information and command selections to processor 1304 and for controlling cursor movement on display 1312. Additional and/or alternative input and output devices may be used.

In certain embodiments, the operations disclosed herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the operations described herein. In alternative embodiments, hard-wired circuitry may be used in place of or in combination with software instructions.

The term "storage media" as used herein refers to any non-transitory media that stores data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, hard disks, solid state drives, magnetic tape devices (or any other magnetic data storage medium), CDs or DVDs (or any other optical data storage medium), any physical media with patterns of holes, RAM modules, a PROM modules, EPROM modules, FLASH-EPROM modules, NVRAM modules, or any other memory chip, cartridge or device.

Storage media is distinct from, but may be used in conjunction with, transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may be carried on a portable storage medium (e.g. a disk or drive), loaded into dynamic memory, sent over a telephone line or other communication network. Bus 1302 carries the instructions to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to network 204. For example, communication interface 1318 may be an integrated services digital network (ISDN) card, cable modem, satellite modem, or a modem to provide a data communication link to a corresponding type of telephone line. As another example, communication interface 1318 may be a network interface card which provides a data communication link to a compatible local area network. Wireless links may also be implemented. In any such implementation, communication interface 218 sends and receives electrical, electromagnetic or optical signals that carry digital data streams representing various types of information.

Network link 1320 typically provides data communication through one or more networks 204 to other computing systems. For example, if the computing system 1300 is a user device part 206, the network link 1320 will provide a connection through network 204 to the cloud platform 202 (and, in certain embodiments, the source code management system 220).

Computer system 1300 can send messages and receive data, including program code, through the network(s), network link 1320 and communication interface 1318.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A computer implemented method for automatically configuring virtual networks hosted by a cloud platform, the method comprising:
   accessing configuration information defining a desired configuration of peering connections between a plurality of virtual networks;
   processing the configuration information to generate a to-create dataset, the to-create dataset comprising one or more peering objects, each peering object of the one or more peering objects defining one or more required virtual network peering connections between a source virtual network and a destination virtual network that are to be connected; and
   for each required virtual network connection of the one or more required virtual connections:
      automatically connecting to the cloud platform to request, from the source virtual network, a connection with the destination virtual network;
      automatically connecting to the cloud platform to accept, from the destination virtual network, the connection requested by the source virtual network;
      automatically connecting to the cloud platform to determine that the connection between the source virtual network and the destination virtual network is established;
      in response to determining the connection is established, automatically connecting to the cloud platform to update a source virtual network route table to define a route from the source virtual network to the destination virtual network; and
      in response to determining the connection is established, automatically connecting to the cloud platform to update a destination virtual network route table to define a route from the destination virtual network to the source virtual network.

2. The computer implemented method of claim 1, wherein the configuration information is stored in a configuration file maintained by a version control system.

3. The computer implemented method of claim 1, wherein:
   the configuration information defines one or more environments and, for each environment, one or more virtual networks belonging to the environment, and
   processing the configuration information to generate the to-create dataset comprises, for each environment:
   determining a network topology desired for the environment; and
   determining the one or more required virtual network connections needed to affect that network topology.

4. The computer implemented method of claim 3, wherein the network topology for a given environment may be determined to be a star topology or a full-mesh topology.

5. The computer implemented method of claim 3, wherein:
   the configuration information defines one or more regions, and
   each environment belongs to a region.

6. The computer implemented method of claim 1, wherein processing the configuration information to generate the to-create dataset comprises:
   processing the configuration information to determine one or more virtual network connections that should exist in the desired configuration;

for each virtual network connection that should exist in the desired configuration:
   determining whether or not the virtual network connection already exists at the cloud platform;
   in response to determining that the virtual network connection does not already exist at the cloud platform, adding information in respect of the virtual network connection to the to-create list.

7. The computer implemented method of claim 1, wherein for a given required virtual network connection, prior to requesting, from the source virtual network, a connection with the destination virtual network, the method further comprises:
   determining whether or not the source and/or destination virtual networks are eligible for automatic connection creation,
   and wherein automatically connecting to the cloud platform to request, from the source virtual network, a connection with the destination virtual network is performed in response to determining that the source and destination virtual networks are eligible for automatic connection creation.

8. The computer implemented method of claim 1, further comprising:
   connecting to the cloud platform to determine existing virtual network connections;
   identifying one or more unneeded virtual network connections by comparing the existing virtual network connections with the network connections of the desired configuration; and
   deleting each unneeded virtual network connection at the cloud platform.

9. The computer implemented method of claim 8, wherein:
   each unneeded virtual network connection comprises a source network, a destination network, and a connection between the source and destination network; and
   deleting an unneeded virtual network connection at the cloud platform comprises:
   automatically connecting to the cloud platform access a route table of the source virtual network;
   updating the route table of the source virtual network to remove any routes to the destination virtual network;
   automatically connecting to the cloud platform access a route table of the destination virtual network;
   updating the route table of the destination virtual network to remove any routes to the source virtual network; and
   deleting the connection between the source and destination virtual networks.

10. A computer processing system configured to automatically configure virtual networks hosted by a cloud platform, the system comprising:
   one or more processors;
   a communications interface;
   one or more non-transitory computer-readable storage media storing sequences of instructions which, when executed by the one or more processors, cause the one or more processors to:
      access configuration information defining a desired configuration of peering connections between a plurality of virtual networks;
      process the configuration information to generate a to-create dataset, the to-create dataset comprising one or more peering objects, each peering object of the one or more peering objects defining one or more required virtual network peering connections between a source virtual network and a destination virtual network that are to be connected; and
      for each required virtual network connection of the one or more required virtual connections:
         connect, via the communications interface, to the cloud platform to request, from the source virtual network, a connection with the destination virtual network;
         connect, via the communications interface, to the cloud platform to accept, from the destination virtual network, the connection requested by the source virtual network;
         determine, via the communications interface, that the connection between the source virtual network and the destination virtual network is established;
         in response to determining the connection is established, connect, via the communications interface, to the cloud platform to update a source virtual network route table to define a route from the source virtual network to the destination virtual network; and
         in response to determining the connection is established, connect, via the communications interface, to the cloud platform to update a destination virtual network route table to define a route from the destination virtual network to the source virtual network.

11. The computer processing system of claim 10, wherein the configuration information is stored in a configuration file maintained by a version control system.

12. The computer processing system of claim 10, wherein:
   the configuration information defines one or more environments and, for each environment, one or more virtual networks belonging to the environment, and
   processing the configuration information to generate the to-create dataset comprises, for each environment:
      determining a network topology desired for the environment; and
      determining the one or more required virtual network connections needed to affect that network topology.

13. The computer processing system of claim 12, wherein the network topology for a given environment may be determined to be a star topology or a full-mesh topology.

14. The computer processing system of claim 12, wherein:
   the configuration information defines one or more regions, and
   each environment belongs to a region.

15. The computer processing system of claim 10, wherein processing the configuration information to generate the to-create dataset comprises:
   processing the configuration information to determine one or more virtual network connections that should exist in the desired configuration;
   for each virtual network connection that should exist in the desired configuration:
      determining whether or not the virtual network connection already exists at the cloud platform;
      in response to determining that the virtual network connection does not already exist at the cloud platform, adding information in respect of the virtual network connection to the to-create list.

16. The computer processing system of claim 10, wherein for a given required virtual network connection, prior to requesting, from the source virtual network, a connection with the destination virtual network, the method further comprises:
    determining whether or not the source and/or destination virtual networks are eligible for automatic connection creation,
    and wherein automatically connecting to the cloud platform to request, from the source virtual network, a connection with the destination virtual network is performed in response to determining that the source and destination virtual networks are eligible for automatic connection creation.

17. The computer processing system of claim 10, further comprising:
    connecting to the cloud platform to determine existing virtual network connections;
    identifying one or more unneeded virtual network connections by comparing the existing virtual network connections with the network connections of the desired configuration; and
    deleting each unneeded virtual network connection at the cloud platform.

18. The computer processing system of claim 17, wherein:
    each unneeded virtual network connection comprises a source network, a destination network, and a connection between the source and destination network; and
    deleting an unneeded virtual network connection at the cloud platform comprises:
        automatically connecting to the cloud platform access a route table of the source virtual network;
        updating the route table of the source virtual network to remove any routes to the destination virtual network;
        automatically connecting to the cloud platform access a route table of the destination virtual network;
        updating the route table of the destination virtual network to remove any routes to the source virtual network; and
    deleting the connection between the source and destination virtual networks.

* * * * *